United States Patent
Dwan et al.

(10) Patent No.: US 9,563,820 B2
(45) Date of Patent: *Feb. 7, 2017

(54) PRESENTATION AND ORGANIZATION OF CONTENT

(71) Applicant: DROPBOX, INC., San Francisco, CA (US)

(72) Inventors: Michael Dwan, San Francisco, CA (US); Jinpeng Ren, Mountain View, CA (US)

(73) Assignee: Dropbox, Inc., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/870,416

(22) Filed: Sep. 30, 2015

(65) Prior Publication Data
US 2016/0026896 A1    Jan. 28, 2016

Related U.S. Application Data

(63) Continuation of application No. 13/888,186, filed on May 6, 2013, now Pat. No. 9,230,191.
(Continued)

(51) Int. Cl.
*G06K 9/00* (2006.01)
*G06K 9/62* (2006.01)
(Continued)

(52) U.S. Cl.
CPC .......... *G06K 9/622* (2013.01); *G06F 17/3028* (2013.01); *G06F 17/30247* (2013.01);
(Continued)

(58) Field of Classification Search
USPC .................................. 382/224, 305
See application file for complete search history.

(56) References Cited

U.S. PATENT DOCUMENTS 5,991,713 A * 11/1999 Unger ................. H03M 7/3084
704/1
6,230,168 B1 * 5/2001 Unger ............... G06F 17/30882
707/E17.013
(Continued)

OTHER PUBLICATIONS

U.S. Appl. No. 13/888,186, filed May 6, 2013, Office Action, Dec. 17, 2014.
(Continued)

*Primary Examiner* — Ishrat I Sherali
(74) *Attorney, Agent, or Firm* — Hickman Palermo Becker Bingham LLP

(57) ABSTRACT

Embodiments are provided for organization and presentation of content. In some embodiments, a plurality of images and a plurality of similarity rules for image categorization are received. For each image in the plurality of images, that image and each remaining image from the plurality is compared by: applying each similarity rule to the image and a remaining image from the plurality to obtain a numeric result, and recording the numeric result for the pair of images in a numeric representation, the numeric representation embodying similarities. The numeric representation is used as a reference for clustering the plurality of images into clusters of similar images, and each image is stored with a marker denoting a cluster to which it has been assigned.

20 Claims, 14 Drawing Sheets

Related U.S. Application Data

(60) Provisional application No. 61/794,184, filed on Mar. 15, 2013.

(51) Int. Cl.
  *G06F 17/30* (2006.01)
  *G06T 5/50* (2006.01)
  *G06T 11/60* (2006.01)

(52) U.S. Cl.
  CPC .. *G06F 17/30345* (2013.01); *G06F 17/30424* (2013.01); *G06F 17/30427* (2013.01); *G06K 9/00684* (2013.01); *G06K 9/6215* (2013.01); *G06K 9/6218* (2013.01); *G06T 5/50* (2013.01); *G06T 11/60* (2013.01); *G06T 2207/30204* (2013.01)

(56) References Cited

U.S. PATENT DOCUMENTS

| | | | | |
|---|---|---|---|---|
| 6,886,130 | B1* | 4/2005 | Unger | G06F 17/30899 707/E17.119 |
| 7,593,602 | B2* | 9/2009 | Stentiford | G06F 17/30265 358/403 |
| 7,689,064 | B2 | 3/2010 | Miksovsky et al. | |
| 7,711,187 | B2 | 5/2010 | Wafler | |
| 8,531,478 | B2 | 9/2013 | Lee et al. | |
| 8,750,629 | B2* | 6/2014 | Ma | G06F 17/30268 382/218 |
| 8,934,723 | B2* | 1/2015 | Dwan | G06K 9/00684 382/224 |
| 2006/0195475 | A1 | 8/2006 | Logan et al. | |
| 2008/0205775 | A1 | 8/2008 | Brinker et al. | |
| 2008/0205789 | A1 | 8/2008 | Ten Kate et al. | |
| 2008/0292212 | A1 | 11/2008 | Ozaki | |
| 2009/0279794 | A1* | 11/2009 | Brucher | G06F 17/30241 382/225 |
| 2010/0094441 | A1 | 4/2010 | Mochizuki et al. | |
| 2010/0172551 | A1 | 7/2010 | Gilley et al. | |
| 2011/0064317 | A1 | 3/2011 | Ubillos | |
| 2011/0150366 | A1* | 6/2011 | Yoda | G06F 17/30247 382/305 |
| 2011/0157218 | A1 | 6/2011 | Ptucha et al. | |
| 2012/0076401 | A1 | 3/2012 | Sanchez et al. | |
| 2012/0328190 | A1 | 12/2012 | Bercovich et al. | |
| 2013/0125002 | A1* | 5/2013 | Spaeth | G06F 3/0482 715/731 |
| 2016/0019438 | A1 | 1/2016 | Dwan et al. | |

OTHER PUBLICATIONS

U.S. Appl. No. 13/888,186, filed May 6, 2013, Notice of Allowance, Jul. 16, 2015.

Papadopoulos et al., "Image Clustering Through Community Detection on Hybrid Image Similarity Graphs", ICIP, dated 2010, 4 pages.

Lin et al., "Discovering Multi-Relational Structure in Social Media Streams", TOMM, vol. 8, Issue 1, dated Jan. 2012, 25 pages.

Kim et al., "Modeling and Analysis of Dynamic Behaviors of Web Image Collections", ECCV dated 2010, 14 pages.

Guha, S., et al., "Rock: A Robust Clustering Algorithm for Categorical Attributes":, Proceedings of the 15th International Conference on Data Engineering (ICDE '99), IEEE Computer Society, 10 pages.

Graham et al., "Time As Essence for Photo Browsing Through Personal Digital Libraries", JCDL, dated 2002, 10 pages.

U.S. Appl. No. 14/868,914, filed Sep. 29, 2015, Office Action, Apr. 15, 2016.

\* cited by examiner

|   | A | B | C | D | E | F | G | H | I |
|---|---|---|---|---|---|---|---|---|---|
| A | X |   |   |   |   |   |   |   |   |
| B | 0 | X |   |   |   |   |   |   |   |
| C | 0 | 1 | X |   |   |   |   |   |   |
| D | 0 | 1 | 1 | X |   |   |   |   |   |
| E | 0 | 1 | 1 | 1 | X |   |   |   |   |
| F | 0 | 1 | 1 | 1 | 1 | X |   |   |   |
| G | 0 | 1 | 1 | 1 | 1 | 1 | X |   |   |
| H | 0 | 1 | 1 | 1 | 1 | 1 | 1 | X |   |
| I | 0 | 1 | 1 | 1 | 1 | 1 | 1 | 1 | X |

FIG. 3B

|   | A | B | C | D | E | F | G | H | I |
|---|---|---|---|---|---|---|---|---|---|
| A | X |   |   |   |   |   |   |   |   |
| B | 0 | X |   |   |   |   |   |   |   |
| C | 1 | 0 | X |   |   |   |   |   |   |
| D | 1 | 0 | 1 | X |   |   |   |   |   |
| E | 1 | 0 | 1 | 1 | X |   |   |   |   |
| F | 1 | 0 | 1 | 1 | 1 | X |   |   |   |
| G | 1 | 0 | 1 | 1 | 1 | 1 | X |   |   |
| H | 1 | 0 | 1 | 1 | 1 | 1 | 1 | X |   |
| I | 1 | 0 | 1 | 1 | 1 | 1 | 1 | 1 | X |

FIG. 3C

PRESENTATION AND ORGANIZATION OF CONTENT

CROSS-REFERENCE TO RELATED APPLICATIONS

This application claims the benefit under 35 USC §120 as a continuation of application Ser. No. 13/888,186, filed on May 6, 2013, which claims the benefit under 35 U.S.C. §119(e) of provisional application 61/794,184, filed on Mar. 15, 2013. The entire contents of each of the above listed applications is hereby incorporated by reference as if fully set forth herein. The applicant(s) hereby rescind any disclaimer of claim scope in the parent application(s) or the prosecution history thereof and advise the USPTO that the claims in this application may be broader than any claim in the parent application(s).

FIELD OF THE INVENTION

Various embodiments relate generally to content organization and presentation with a content management system.

BACKGROUND

Recent technological advancements in capturing and recording images include features that allow users to capture and record images in rapid succession—often within microseconds or seconds of each other—thus creating large sets of user photos on user devices (e.g., smartphones). With the decrease in cost of storage, users often store a large number of their captured photos both on their smartphones and cameras, as well as in remote storage. Instead of reviewing and organizing photos on the camera or within storage when a user's memory about the recently captured photos is still fresh, users simply upload the entire set to content management systems to review and organize their captured images at a later date.

As the number of photos increases on, for example, both a camera and within storage, the task of organizing stored photos becomes overwhelming. Adding to the complexity in organizing photos, the user may also have images from other sources, such as images shared by others and/or from multiple devices, often times captured at the same events as, or having subject matter of, other photos stored by the user, but not being stored together because they were uploaded from different sources or at different times. As a user's stored photos both increase in number and include multiple sources, organization and presentation of photos within a user interface that communicates in a meaningful way which images are stored, and how they may be related, becomes more complex.

Accordingly, there is a need for improved organization and presentation of images.

SUMMARY

Embodiments are provided for organization and presentation of content. In some embodiments, a plurality of images and a plurality of similarity rules for image categorization are received. For each image in the plurality of images, that image and each remaining image from the plurality are compared by: applying each similarity rule to the image and a remaining image from the plurality to obtain a numeric result, and recording the numeric result for the pair of images in a numeric representation, the numeric representation embodying similarities. The numeric representation is used as a reference for clustering the plurality of images into clusters of similar images, and each image is stored with a marker denoting a cluster to which it has been assigned.

BRIEF DESCRIPTION OF THE DRAWINGS

The above and other aspects and advantages of the invention will become more apparent upon consideration of the following detailed description, taken in conjunction with accompanying drawings, in which like reference characters refer to like parts throughout, and in which:

FIG. 3B illustrates an exemplary numeric representation for presentation and organization of content in accordance with some embodiments of the invention;

FIG. 3C illustrates an exemplary numeric representation for presentation and organization of content in accordance with some embodiments of the invention;

DETAILED DESCRIPTION OF THE DISCLOSURE

Methods, systems, and computer readable mediums for organization and presentation of photos are provided. Content items managed by a content management system may be organized and then presented within a user interface to encourage the user to interact with the system and educate the user on the content items managed by the content management system. Each content item (e.g., images) may be categorized in accordance with similarity rules and organized in to clusters with other content items falling into the same categories regardless of the source of the content items. The clustering performed may use metadata associated with the content items to more accurately sort the images so that the user does not have to rely on memory to sort their own images.

Content items may be clustered on a client device prior to upload to the content management system, upon upload to a content management system, and/or any combination thereof. In some embodiments, content items (e.g., thumbnail or other representation for an image) may be displayed within the user interface with the other content items from the corresponding cluster, with an indicator for the corresponding cluster, and/or with a link to navigate to another user interface to display the cluster.

User interfaces may provide a sample of content items managed by the content management system displayed within mosaics with rows and columns. Each row of a mosaic may have content items (e.g., thumbnails or other representations) displayed in a temporal sequence. The rows of the mosaic may display content items for a particular unit of time (e.g., years, months, days). The sample may be random or pseudo-random selection of images that are continually updated to ensure that the user is educated about the contents within their account with the content management system. A user can then select an image from a sample displayed within the user interface and navigate to a user interface to view the content items clustered with the selected image.

For purposes of description and simplicity, methods, systems and computer readable mediums will be described for a content storage and management service, and in particular, organization and presentation of content items (e.g., images). However, the terms "content storage service" and "content management system" are used herein to refer broadly to a variety of storage providers and management service providers as well as handling a wide variety of types of content, files, portions of files, and/or other types of data. Those with skill in the art will recognize that the methods, systems, and mediums described for organizing and presenting content items may be used for a variety of storage providers/services and types of content, files, portions of files, and/or other types of data.

Figure 1:
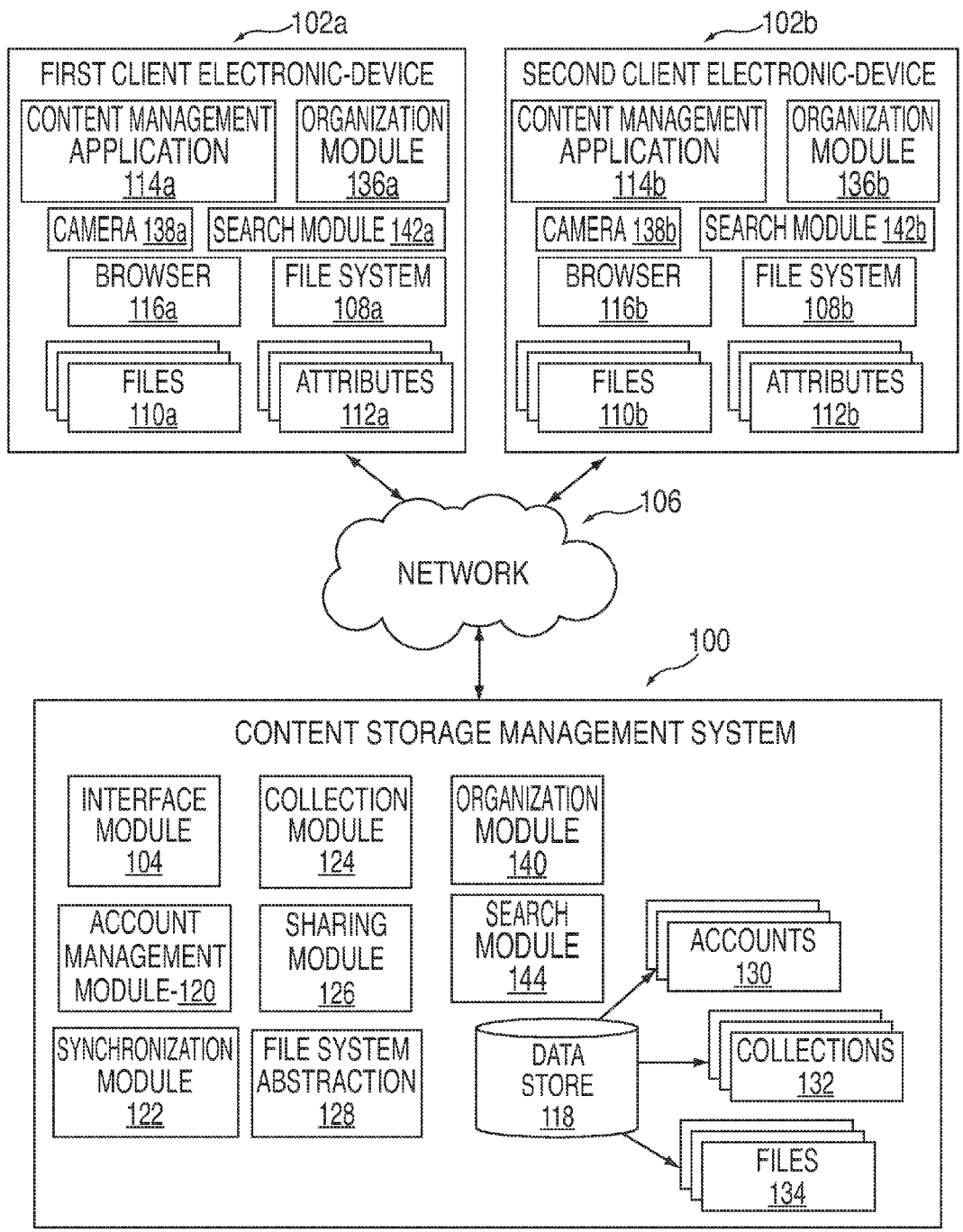
FIG. 1 is an exemplary system for presentation and organization of content in accordance with some embodiments of the invention.

FIG. 1 is an exemplary system for presentation and organization of content in accordance with some embodiments of the invention. Elements in FIG. 1, including, but not limited to, first client electronic device 102a,second client electronic device 102b, and content management system 100 may communicate by sending and/or receiving data over network 106. Network 106 may be any network, combination of networks, or network devices that can carry data communication. For example, network 106 may be any one or any combination of LAN (local area network), WAN (wide area network), telephone network, wireless network, point-to point network, star network, token ring network, hub network, or any other configuration.

Network 106 can support any number of protocols, including but not limited to TCP/IP (Transfer Control Protocol and Internet Protocol), HTTP (Hypertext Transfer Protocol), WAP (wireless application protocol), etc. For example, first client electronic device 102a and second client electronic device 102b (collectively 102) may communicate with content management system 100 using TCP/IP, and, at a higher level, use browser 116 to communicate with a web server (not shown) at content management system 100 using HTTP. Examples of implementations of browser 116, include, but are not limited to, Google Inc. Chrome™ browser, Microsoft Internet Explorer®, Apple Safari®, Mozilla Firefox, and Opera Software Opera.

A variety of client electronic devices 102 can communicate with content management system 100, including, but not limited to, desktop computers, mobile computers, mobile communication devices (e.g., mobile phones, smart phones, tablets), televisions, set-top boxes, and/or any other network enabled device. Although two client electronic devices 102a and 102b are illustrated for description purposes, those with skill in the art will recognize that any number of devices may be used and supported by content management system 100. Client electronic devices 102 may be used to create, access, modify, and manage files 110a and 110b (collectively 110) (e.g. files, file segments, images, etc.) stored locally within file system 108a and 108b (collectively 108) on client electronic device 102 and/or stored remotely with content management system 100 (e.g., within data store 118). For example, client electronic device 102a may access file 110b stored remotely with data store 118 of content management system 100 and may or may not store file 110b locally within file system 108a on client electronic device 102a. Continuing with the example, client electronic device 102a may temporarily store file 110b within a cache (not shown) locally within client electronic device 102a, make revisions to file 110b,and the revisions to file 110b may be communicated and stored in data store 118 of content management system 100. Optionally, a local copy of the file 110a may be stored on client electronic device 102a.

In particular, client devices 102 may capture, record, and/or store content items, such as image files 110. Client devices 102 may have a camera 138 (e.g., 138a and 138b) to capture and record digital images and/or videos. For example, camera 138 may capture and record images and store metadata with the images. Metadata may include creation time, geolocation, orientation, rotation, title, and/or any other attributes or data relevant to the captured image. Metadata values may be stored as attribute 112 name-value pairs, tag-value pairs, and/or any other method to associate the metadata with the file and easily identify the type of metadata. In some embodiments, attributes 112 may be tag-value pairs defined by a particular standard, including, but not limited to, Exchangeable Image File Format (Exif), JPEG File Interchange Format (Jfif), and/or any other standard.

An organization module 136 (e.g., 136a and 136b) may be used to organize content items (e.g., image files) into clusters, organize content items to provide samples of content items for display within user interfaces, and/or retrieve organized content items for presentation. The organization module 136 may utilize any clustering algorithm, including, but not limited to, algorithms implementing at least a portion of the ROCK algorithm and/or any other clustering algorithm. The ROCK algorithm is described in Guha, S., et al., "*ROCK: A Robust Clustering Algorithm for Categorical Attributes,*" Proceedings of the 15$^{th}$ International Conference on Data Engineering (ICDE '99), IEEE Computer Society, Washington, D.C., USA, pp. 512-521 (1999), and is hereby incorporated by reference in its entirety. The organization module 136 may be used to identify similar images for clusters in order to organize content items for presentation within user interfaces on devices 102 and content management system 100. Similarity rules may be defined to create one or more numeric representations embodying information on similarities between each of the content items in accordance with the similarity rules. The organization module 136 may use the numeric representation as a reference for similarity between content items to cluster the content items.

In some embodiments, content items may be organized into clusters to aid with retrieval of similar content items in response to search requests. For example, organization module 136a may identify first and second images are similar and may be group the images together in a cluster. Organization module 136a may process image files to determine clusters independently or in conjunction with counterpart organization module (e.g., 140 and/or 136b). In other embodiments, organization module 136a may only provide clusters identified with counterpart organization modules (e.g., 140 and/or 136b) for presentation. Continuing with the example, processing of image files to determine clusters may be an iterative process that is executed upon receipt of new content items and/or new similarity rules.

In some embodiments, a search module 142 on client device 102 is provided with counterpart search module 144 on content management system 144 to support search for content items. A search request may be received by search module 142 and/or 144 that requests a content item for a particular date, and the search may be handled by searching cluster markers of stored images. For example, cluster markers may indicate an approximate time or average time for the images stored with the cluster marker in some embodiments, and the marker may be used to speed the search and/or return the search results with the at least one image file of the cluster with particular cluster markers.

Files 110 managed by content management system 100 may be stored locally within file system 108 of respective devices 102 and/or stored remotely within data store 118 of content management system 100 (e.g., files 134 in data store 118). Content management system 100 may provide synchronization of files managed by content management system 100. Attributes 112 or other metadata may be stored with files 110. For example, a particular attribute may be stored with the file to track files locally stored on client devices 102 that are managed and/or synchronized by content management system 100. In some embodiments, attributes 112 may be implemented using extended attributes, resource forks, or any other implementation that allows for storing metadata with a file that is not interpreted by a file system. In particular, an attribute 112a and 112b may be a content identifier for a file. For example, the content identifier may be a unique or nearly unique identifier (e.g., number or string) that identifies the file.

By storing a content identifier with the file, a file may be tracked. For example, if a user moves the file to another location within the file system 108 hierarchy and/or modifies the file, then the file may still be identified within the local file system 108 of a client device 102. Any changes or modifications to the file identified with the content identifier may be uploaded or provided for synchronization and/or version control services provided by the content management system 100.

A stand-alone content management application 114a and 114b (collectively 114), client application, and/or third-party application may be implemented to provide a user interface for a user to interact with content management system 100. Content management application 114 may expose the functionality provided with content management interface 104. Web browser 116a and 116b (collectively 116) may be used to display a web page front end for a client application that can provide content management 100 functionality exposed/provided with content management interface 104.

Content management system 100 may allow a user with an authenticated account to store content, as well as perform management tasks, such as retrieve, modify, browse, synchronize, and/or share content with other accounts. Various embodiments of content management system 100 may have elements, including, but not limited to, content management interface module 104, account management module 120, synchronization module 122, collections module 124, sharing module 126, file system abstraction 128, data store 118, and organization module 140. The content management service interface module 104 may expose the server-side or back end functionality/capabilities of content management system 100. For example, a counter-part user interface (e.g., stand-alone application, client application, etc.) on client electronic devices 102 may be implemented using content management service interface 104 to allow a user to perform functions offered by modules of content management system 100. In particular, content management system 100 may have an organization module 140 for identifying similar content items for clusters and samples of content items for presentation within user interfaces.

The user interface offered on client electronic device 102 may be used to create an account for a user and authenticate a user to use an account using account management module 120. The account management module 120 of the content management service may provide the functionality for authenticating use of an account by a user and/or a client electronic device 102 with username/password, device identifiers, and/or any other authentication method. Account information 130 can be maintained in data store 118 for accounts. Account information may include, but is not limited to, personal information (e.g., an email address or username), account management information (e.g., account type, such as "free" or "paid"), usage information, (e.g., file edit history), maximum storage space authorized, storage space used, content storage locations, security settings, personal configuration settings, content sharing data, etc. An amount of content management may be reserved, allotted, allocated, stored, and/or may be accessed with an authenticated account. The account may be used to access files 110 within data store 118 for the account and/or files 110 made accessible to the account that are shared from another account. Account module 124 can interact with any number of other modules of content management system 100.

An account can be used to store content, such as documents, text files, audio files, video files, etc., from one or more client devices 102 authorized on the account. The content can also include folders of various types with different behaviors, or other mechanisms of grouping content items together. For example, an account can include a public folder that is accessible to any user. The public folder can be assigned a web-accessible address. A link to the web-accessible address can be used to access the contents of the public folder. In another example, an account can include a photos folder that is intended for photos and that provides specific attributes and actions tailored for photos; an audio folder that provides the ability to play back audio files and perform other audio related actions; or other special purpose folders. An account can also include shared folders or group folders that are linked with and available to multiple user accounts. The permissions for multiple users may be different for a shared folder.

Content items (e.g., files 110) can be stored in data store 118. Data store 118 can be a storage device, multiple storage devices, or a server. Alternatively, data store 118 can be cloud storage provider or network storage accessible via one or more communications networks. Content management system 100 can hide the complexity and details from client devices 102 by using a file system abstraction 128 (e.g., a file system database abstraction layer) so that client devices 102 do not need to know exactly where the content items are being stored by the content management system 100. Embodiments can store the content items in the same folder hierarchy as they appear on client device 102. Alternatively, content management system 100 can store the content items in various orders, arrangements, and/or hierarchies. Content management system 100 can store the content items in a network accessible storage (SAN) device, in a redundant array of inexpensive disks (RAID), etc. Content management system 100 can store content items using one or more partition types, such as FAT, FAT32, NTFS, EXT2, EXT3, EXT4, ReiserFS, BTRFS, and so forth.

Data store 118 can also store metadata describing content items, content item types, and the relationship of content items to various accounts, folders, collections, or groups. The metadata for a content item can be stored as part of the content item or can be stored separately. Metadata can be store in an object-oriented database, a relational database, a file system, or any other collection of data. In one variation, each content item stored in data store 118 can be assigned a system-wide unique identifier.

Data store 118 can decrease the amount of storage space required by identifying duplicate files or duplicate chunks of files. Instead of storing multiple copies, data store 118 can store a single copy of a file 134 and then use a pointer or other mechanism to link the duplicates to the single copy. Similarly, data store 118 can store files 134 more efficiently, as well as provide the ability to undo operations, by using a file version control that tracks changes to files, different versions of files (including diverging version trees), and a change history. The change history can include a set of changes that, when applied to the original file version, produce the changed file version.

Content management system 100 can be configured to support automatic synchronization of content from one or more client devices 102. The synchronization can be platform independent. That is, the content can be synchronized across multiple client devices 102 of varying type, capabilities, operating systems, etc. For example, client device 102a can include client software, which synchronizes, via a synchronization module 122 at content management system 100, content in client device 102 file system 108 with the content in an associated user account. In some cases, the client software can synchronize any changes to content in a designated folder and its sub-folders, such as new, deleted, modified, copied, or moved files or folders. In one example of client software that integrates with an existing content management application, a user can manipulate content directly in a local folder, while a background process monitors the local folder for changes and synchronizes those changes to content management system 100. In some embodiments, a background process can identify content that has been updated at content management system 100 and synchronize those changes to the local folder. The client software can provide notifications of synchronization operations, and can provide indications of content statuses directly within the content management application. Sometimes client device 102 may not have a network connection available. In this scenario, the client software can monitor the linked folder for file changes and queue those changes for later synchronization to content management system 100 when a network connection is available. Similarly, a user can manually stop or pause synchronization with Content management system 100.

A user can also view or manipulate content via a web interface generated and served by user interface module 104. For example, the user can navigate in a web browser to a web address provided by content management system 100. Changes or updates to content in the data store 118 made through the web interface, such as uploading a new version of a file, can be propagated back to other client devices 102 associated with the user's account. For example, multiple client devices 102, each with their own client software, can be associated with a single account and files in the account can be synchronized between each of the multiple client devices 102.

Content management system 100 can include sharing module 126 for managing sharing content and/or collections of content publicly or privately. Sharing content publicly can include making the content item and/or the collection accessible from any computing device in network communication with content management system 100. Sharing content privately can include linking a content item and/or a collection in data store 118 with two or more user accounts so that each user account has access to the content item. In particular, the sharing module 126 can be used with the collections module 124 to allow sharing of a virtual collection with another user or user account. The sharing can be performed in a platform independent manner. That is, the content can be shared across multiple client devices 102 of varying type, capabilities, operating systems, etc. The content can also be shared across varying types of user accounts.

In some embodiments, content management system 100 can be configured to maintain a content directory or a database table/entity for content items where each entry or row identifies the location of each content item in data store 118. In some embodiments, a unique or a nearly unique content identifier may be stored for each content item stored in the data store 118.

Metadata can be stored for each content item. For example, metadata can include a content path that can be used to identify the content item. The content path can include the name of the content item and a folder hierarchy associated with the content item (e.g., the path for storage locally within a client device 102). In another example, the content path can include a folder or path of folders in which the content item is placed as well as the name of the content item. Content management system 100 can use the content path to present the content items in the appropriate folder hierarchy in a user interface with a traditional hierarchy view. A content pointer that identifies the location of the content item in data store 118 can also be stored with the content identifier. For example, the content pointer can include the exact storage address of the content item in memory. In some embodiments, the content pointer can point to multiple locations, each of which contains a portion of the content item.

In addition to a content path and content pointer, a content item entry/database table row in a content item database entity can also include a user account identifier that identifies the user account that has access to the content item. In some embodiments, multiple user account identifiers can be associated with a single content entry indicating that the content item has shared access by the multiple user accounts.

To share a content item privately, sharing module 126 can be configured to add a user account identifier to the content entry or database table row associated with the content item, thus granting the added user account access to the content item. Sharing module 126 can also be configured to remove user account identifiers from a content entry or database table rows to restrict a user account's access to the content item. The sharing module 126 may also be used to add and remove user account identifiers to a database table for virtual collections.

To share content publicly, sharing module 126 can be configured to generate a custom network address, such as a uniform resource locator (URL), which allows any web browser to access the content in content management system 100 without any authentication. To accomplish this, sharing module 126 can be configured to include content identification data in the generated URL, which can later be used to properly identify and return the requested content item. For example, sharing module 126 can be configured to include the user account identifier and the content path in the generated URL. Upon selection of the URL, the content identification data included in the URL can be transmitted to content management system 100 which can use the received content identification data to identify the appropriate content entry and return the content item associated with the content entry.

To share a virtual collection publicly, sharing module 126 can be configured to generate a custom network address, such as a uniform resource locator (URL), which allows any web browser to access the content in content management system 100 without any authentication. To accomplish this, sharing module 126 can be configured to include collection identification data in the generated URL, which can later be used to properly identify and return the requested content item. For example, sharing module 126 can be configured to include the user account identifier and the collection identifier in the generated URL. Upon selection of the URL, the content identification data included in the URL can be transmitted to content management system 100 which can use the received content identification data to identify the appropriate content entry or database row and return the content item associated with the content entry or database row.

In addition to generating the URL, sharing module 126 can also be configured to record that a URL to the content item has been created. In some embodiments, the content entry associated with a content item can include a URL flag indicating whether a URL to the content item has been created. For example, the URL flag can be a Boolean value initially set to 0 or false to indicate that a URL to the content item has not been created. Sharing module 126 can be configured to change the value of the flag to 1 or true after generating a URL to the content item.

In some embodiments, sharing module 126 can also be configured to deactivate a generated URL. For example, each content entry can also include a URL active flag indicating whether the content should be returned in response to a request from the generated URL. For example, sharing module 126 can be configured to only return a content item requested by a generated link if the URL active flag is set to 1 or true. Changing the value of the URL active flag or Boolean value can easily restrict access to a content item or a collection for which a URL has been generated. This allows a user to restrict access to the shared content item without having to move the content item or delete the generated URL. Likewise, sharing module 126 can reactivate the URL by again changing the value of the URL active flag to 1 or true. A user can thus easily restore access to the content item without the need to generate a new URL.

Figure 2A:
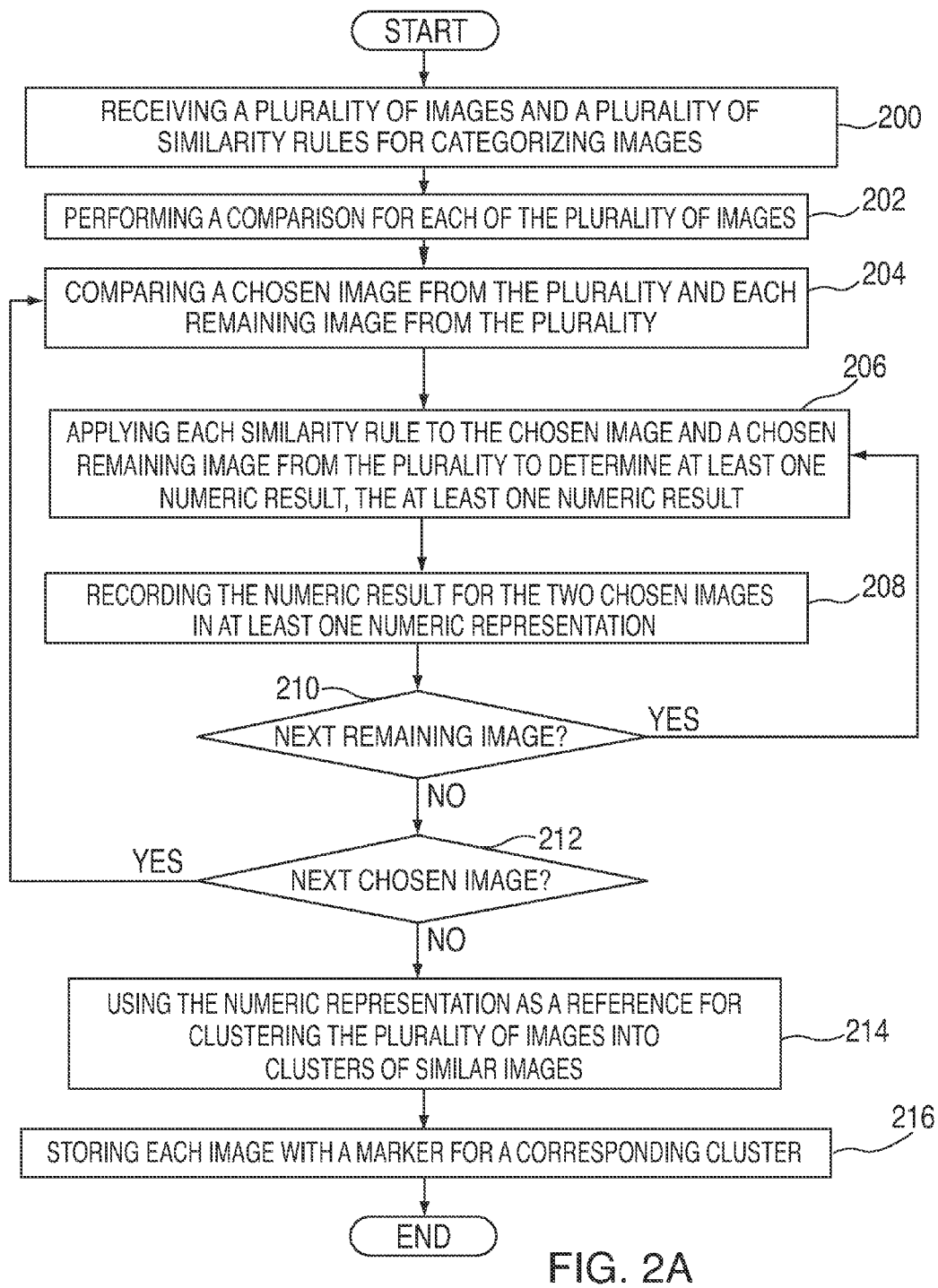
FIG. 2A is an exemplary flowchart for presentation and organization of content in accordance with some embodiments of the invention.

FIG. 2A is an exemplary flowchart for presentation and organization of content in accordance with some embodiments of the invention. FIG. 2A is a flowchart for organization of a plurality of content items, such as, for example, images, into clusters of similar content items so that each content may be displayed with similar content items within a cluster. Although the flowchart of FIG. 2A describes organization and presentation of images, those with skill in the art will recognize that the following methods may be performed with various other types of content.

With reference thereto, a plurality of images may be received (200) for organization by content management system 100. For example, an image may be captured and recorded by a client device 102 and/or another source, and then be received by organization module 136 at client device 102. Processing to cluster images may be performed on the client device 102, the content management system 100, and/or any combination thereof. For example, the received image may be compared with other images in an authorized account to organize the content into clusters at client device 102. Images on client device 102 may be managed by content management system 100, and the image may be identified as a candidate for clustering prior to being uploaded to content management system 100. In some embodiments, the image may be processed with other images uploaded to content management system 100 and assigned to a cluster upon upload to the content management system 100.

A plurality of similarity rules for categorizing an image may also be received (200). A similarity rule provides a way to categorize images, and assignment within a given category may indicate, for example, a similarity, commonality, and/or a link between images that makes such images candidates for inclusion in a particular cluster. Similarity rules may be defined to categorize and link images together as being similar based on their metadata (e.g., attribute name-value and/or tag-value pairs associated with the image), information provided by the user, user viewing history learned by an exemplary system and information about the image determined from further processing of the image (e.g., facial recognition, background recognition, etc.). In some embodiments, similarity rules may define a category for images having attributes with a particular threshold value, or having a value within a defined range, as compared to another image or images.

TABLE 2.1 below provides exemplary similarity rules (articulated as questions) and exemplary weightings:

| Rule | Value | Weight |
| --- | --- | --- |
| (1) Is the difference between the creation times of the two compared images less than or equal to four hours? | Boolean (1 or 0) | 5 |
| (2) Is the difference between the geolocation of the two compared images less than or equal to 1000 feet? | Boolean (1 or 0) | 1 |
| (3) Do the two compared images have similar colors or tone? | Boolean (1 or 0) | .1 |
| (4) Do the two compared images contain at least one similar person or similar subject matter? | Boolean (1 or 0) | .2 |
| (5) Do the two compared images have the same camera serial number associated with the image? | Boolean (1 or 0) | .3 |
| (6) Were the two compared images were taken when the temperature was the same? | Boolean (1 or 0) | .5 |

As illustrated in Table 2.1, similarity metrics may rely on comparison of attributes or metadata of the images, such as, for example, creation time, geolocation, title of image, serial number of camera, temperature recorded with image, and/or any other metadata associated with the image. Rules (e.g., rules 3 and 4) may also involve further processing of the images to determine similar colors, tone, facial recognition, and/or similar subject matter. In some embodiments, a user may also define their own rules to drive clustering of images.

The similarity rules may be viewed as defining a similarity index or calculation for the images. Application of the similarity rules may allow for identification of groups of images that have relatively more links and commonality with each other and as a result, may be clustered together. In particular, in some embodiments, groups of images that have a greater link density (e.g., a greater concentration of links between images within the group) may be clustered together.

As described below, link density may be visualized by depicting links as lines between images, and seeing the aggregations of links. The "heavier" the lines connecting two images, the greater the connectedness or similarity.

In some embodiments, similarity rules may be defined to categorize images based on use of services provided by content management system 100. For example, similarity rules may be defined to categorize images based upon who shared the images, an authorized account that shared the images, and/or whether the images were shared with the user. In another example, the similarity rules may be defined to categorize images based upon whether the images have been recently updated, a particular version of an image (e.g. only the first version of an image) and/or synchronized.

In some embodiments, weights may be associated with each rule to reflect the relative proportion that the results from application of each similarity rule should be factored into the clustering results. A user may define rules, as well as skew results, by setting weights to rules. For example, user defined similarity rules may be weighted to ensure that a user-defined rule overrides predefined similarity rules. By way of explanation, a user may define a similarity rule to form a category for all photos that include the terms "Family Christmas Photo" in the title, and the user-defined similarity rule may be assigned a weight (e.g., 15) sufficiently high to override other similarity rules.

In another example, as illustrated in Table 2.1, in some embodiments, rule (1), based on creation times, may factor more heavily than rule (2), based on distance between geolocations. Images captured at various locations may be grouped together, if captured within a window of time. By way of further explanation, images captured on a road trip at various locations (e.g., images taken in Marin, San Francisco, and Palo Alto) within a window of time (e.g., four hours) may be grouped together, even though captured at locations long distances apart from one another.

Figure 3A:
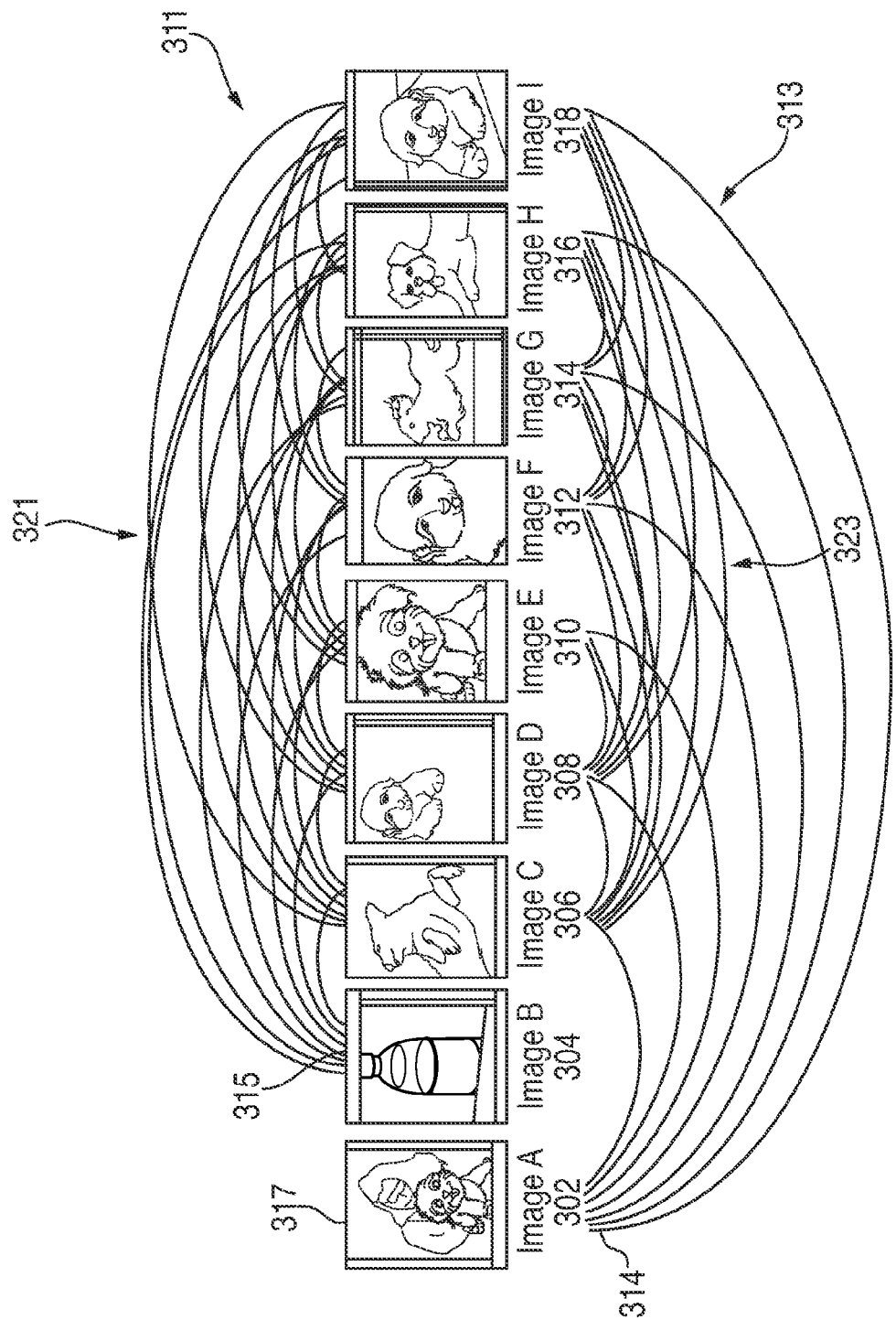
FIG. 3A illustrates exemplary images for presentation and organization of content in accordance with some embodiments of the invention.

To cluster images, a comparison may be performed for each of the plurality of images (202). To perform the comparison for a chosen image, the chosen image from the plurality may be compared to each remaining image from the plurality (204). FIG. 3A illustrates exemplary images for presentation and organization of content in accordance with some embodiments of the invention. For example, as shown in FIG. 3A, exemplary image A 302 may be compared to each of the remaining images stored for a user account, such as, for example, the following images: image B 304, image C 306, image D 308, image E 310, image F 312, image G 314, image H 316, and image I 318.

Each similarity rule may be applied to the chosen image and a chosen one of the remaining images from the plurality to determine at least one numeric result (206). For example, as shown in Table 2.1 above, rules (1) and (2) have a finite set of values available with Boolean result values of either True (1) or False (0). In this example, the numeric result is a value from a finite set of similarity results available with application of the corresponding similarity rule. Continuing with the example, when image A 302 is compared to image B 304 with application of similarity rule (1), the two images are not found to have creation times that are within or equal to four hours (e.g., image A 302 has creation time of Jun. 1, 2011 9:00 am and image B has a creation time of Jun. 13, 2011 12:05 pm) and the numeric result is "0"/False.

The numeric result for the two chosen images is recorded in at least one numeric representation (208). The numeric representation embodies information on the similarities found between image pairs within the plurality of images. The numeric representation may be a matrix containing the results of the comparisons. FIGS. 3B and 3C illustrate exemplary numeric representations for presentation and organization of content in accordance with some embodiments of the invention. For example, a subset of numeric results is illustrated in exemplary matrix 301 in FIG. 3B with application of rule (1) and exemplary matrix 303 in FIG. 3C with application of rule (2). Continuing with the example, numeric results may be recorded in a matrix numeric representation 301 in column 307 for the chosen image A 302 and the remaining images from the plurality. As shown in column 307, image A was not created within or at exactly four hours of time relative to images B-I. Image A was created on June 1 and images B-I were created on June 13 (as illustrated in user interface of FIG. 4). Row 305 for image B 304 provides a result "0" or "False" in the column 307 for image A 302 for the comparison of image A 302 to image B 304 indicating that creation time of image A 302 is not within or equal to four hours of creation time for image B 304. As illustrated in FIG. 3B and FIG. 3C, comparisons between the same images may not be performed as indicated by the "X" (e.g., 309) in the numeric representation matrices 301 and 303.

FIG. 3A has links 311 drawn between the images to visualize the numeric results in numeric representation 301 of FIG. 3B for image A-I with the application of rule (1). As shown, image A 302 does not have a creation time within four hours of any of the other images (e.g., values "0"/False in column 307 between images A and images B-I of FIG. 3B) in accordance with rule (1), and there are no temporal links drawn in FIG. 3A from image A as shown by 317. In contrast, image B may have a creation time within four hours or equal to the creation times of images B-I as denoted by values "1"/True in column 311 of FIG. 3B. To visualize the links, image B 304 has links 315 with image C 306, image D 308, image E 310, image F 312, image G 314, image H 316, and image I 318 in accordance with rule (1) as illustrated in FIG. 3A. FIG. 3A illustrates links 313 drawn between the images A-I to visualize the numeric results in numeric representation 303 of FIG. 3C for image A 302 with application of rule (2).

Continuing with FIG. 2A, if there is a next remaining image (210), then each similarity rule is applied (206) to ensure each of the remaining images is compared to the chosen image. As shown in FIG. 3B, the similarity rule (1) is applied against the next chosen image (e.g. image B) and recorded in numeric representation 301 under column 311 in the rows for the each of the respective remaining images.

In some embodiments, only applying the similarity rules once and reusing the numeric results from the comparisons may shorten processing time for the comparisons. For example, the numeric result "0" in row 305, column 307 for the comparison between image A 302 and image B 304 may be copied to row 319, column 311 for the comparison between image B 304 and Image A 302.

If there are no more remaining images form the plurality (210), a next image from the plurality (212) is chosen, and a comparison is performed between the next chosen image and each remaining image from the plurality (204).

Alternatively, if there are no more images from the plurality for comparison (212), then the at least one numeric representation is used as a reference for clustering the plurality of images into a selected number of clusters of similar images (214).

Any clustering algorithm may be used to cluster the images using the at least one numeric representation as a reference. In some embodiments, the number of clusters may be predefined for use with particular clustering algorithms, such as a K-means algorithm. The predefined number of clusters may be selected based upon the amount of space available for display of the images, based upon an amount of time desired for the creation times of the images within clusters to span, based upon metadata of the images, based upon a similarity rule, and/or any other criteria. For example, similarity rule (1) categorizes images together for four hour increments, so for a given day, there may be six clusters: early morning, mid-morning, late morning, early afternoon, late afternoon, and evening. Continuing with the example, the maximum number of available clusters may depend on how many days the creation time for the images span (e.g., 365 days multiplied by 6). The clustering algorithm may be provided with input including a maximum number of clusters and the at least one numeric representation to determine clusters for the plurality of images.

Figure 2B:
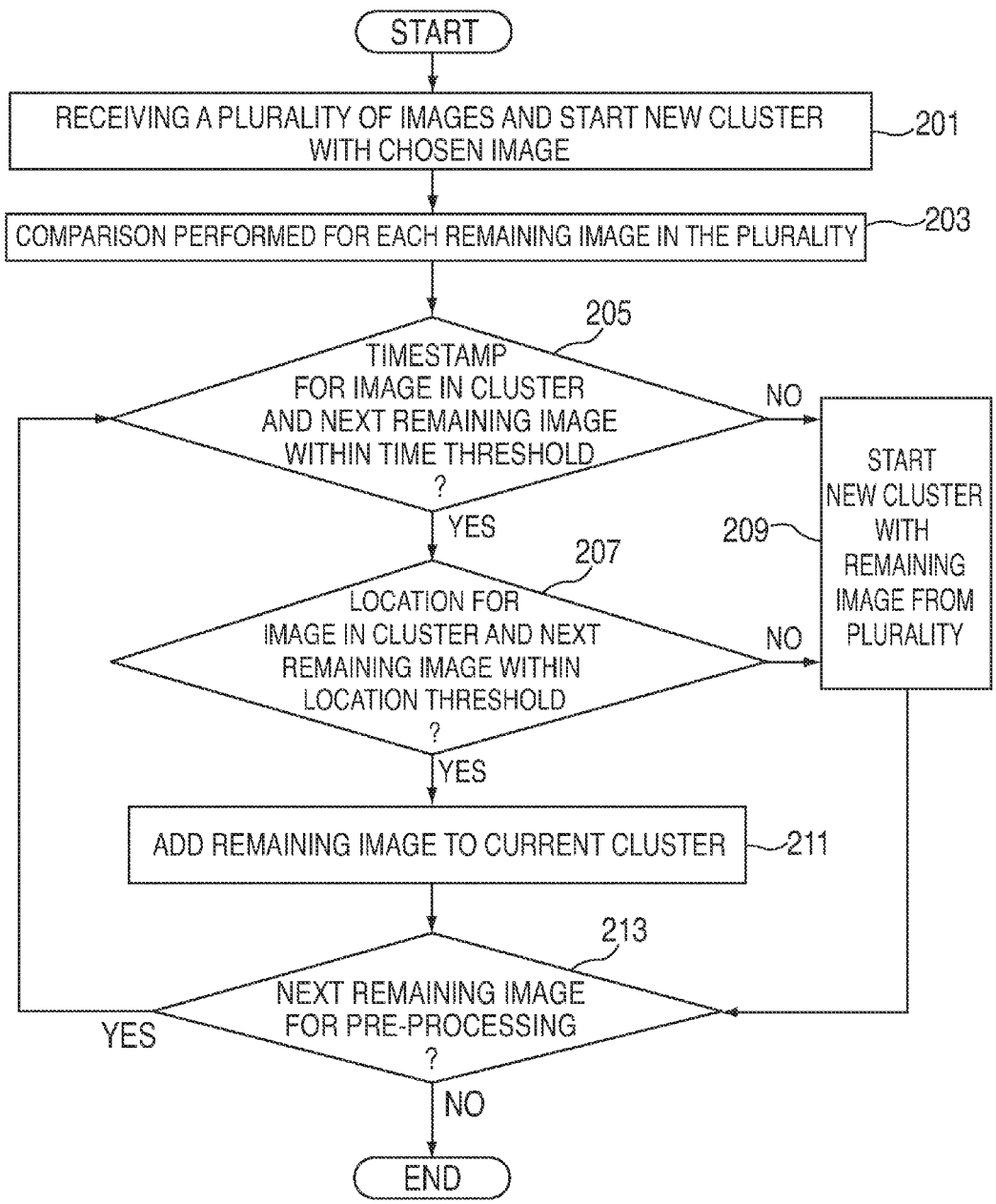
FIG. 2B is an exemplary flowchart for presentation and organization of content in accordance with some embodiments of the invention.

In other embodiments, a clustering algorithm may dynamically determine the optimal number of clusters using the numeric representations with comparison results for each of the images. In some embodiments, each image may initially be placed into its own cluster (e.g., by the clustering algorithm). In other embodiments, the clustering algorithm may be seeded or provided with an initial set of clusters as input, as will be described below with reference to FIG. 2B. Pre-processing may be performed to determine a set of clusters to shorten the processing time for the clustering algorithm, and the set may be provided as input to the clustering algorithm. FIG. 2B, described below, provides an exemplary flowchart for presentation and organization of content in accordance with some embodiments of the invention that illustrates determining a set of clusters. In some embodiments, the set of clusters input to the system may be clusters determined from earlier processing of a plurality of clusters for a user account, and the process of FIG. 2A may be performed for a new set of images to be clustered for the user account.

To find the optimal number of clusters, one exemplary algorithm may iterate through the clusters and repeatedly attempt to merge the cluster until there are no more clusters that can be merged. To identify clusters that may be merged, the numeric representations are referenced to analyze links or commonality between images in their respective clusters and merge the clusters based on the density of links between images found. In some embodiments, the weight associated with the link or commonality between the images may determine whether the clusters should be merged.

FIG. 3A provides a way to visualize how clusters may be determined by analyzing link densities between images. For example, image A 302 may be an image captured at a park on early morning Jun. 1, 2011, image B 304 may be an image captured at a restaurant located greater than 1000 feet from the park on Jun. 13, 2011 and images C-I may be captured at the same park on Jun. 13, 2011. In the simplest case, as illustrated, image A 302 does not have links (as shown at 317), thus 317 denoting that creation time for image A is not within or equal to four hours of image B 304 in accordance with rule (1), and image A 302 does not have links (as shown at 319) with image B 304, thus denoting image A 302 was captured at a location greater than 1000 feet from image B 304 in accordance with rule (2). As a result, image A 302 is not clustered with image B 304. By comparison, image A 302 is not linked to images C-I based on time in accordance with rule (1) but is linked to images C-I based on location in accordance with rule (2). Although image A 302 is linked to images C-I based on location (e.g., captured at the same park), the link densities (illustrated at 321 and 323) are greater between images C-I for both rule (1) based on time and rule (2) based on location, and as a result, image A 302 is clustered on its own, where images C-I are clustered together. Similarly, image B 304 is linked to images C-I based on time (e.g., captured within four hours), the link densities (illustrated at 321 and 323) are greater between images C-I for both rules (1) based on time and rule (2) based on location, and as a result, image B 304 is clustered on its own, where images C-I are clustered together. As noted above, clustering results may be skewed based on the weights of the respective rules. For example, if time based rule (1) is weighted proportionately higher than location based rule (2), then image B 304 may be in fact clustered with images C-I.

If pre-processing is used as described in FIG. 2B, and is only based upon time (e.g., clustering images within eight hours of each other), then image B 304 may be initially clustered with images C-I. Continuing with the example, the clustering algorithm may analyze the link densities 321 and 323 between image C-I, and then pull image B from its initial cluster because the location was not close enough to warrant clustering it with images C-I.

Figure 4:
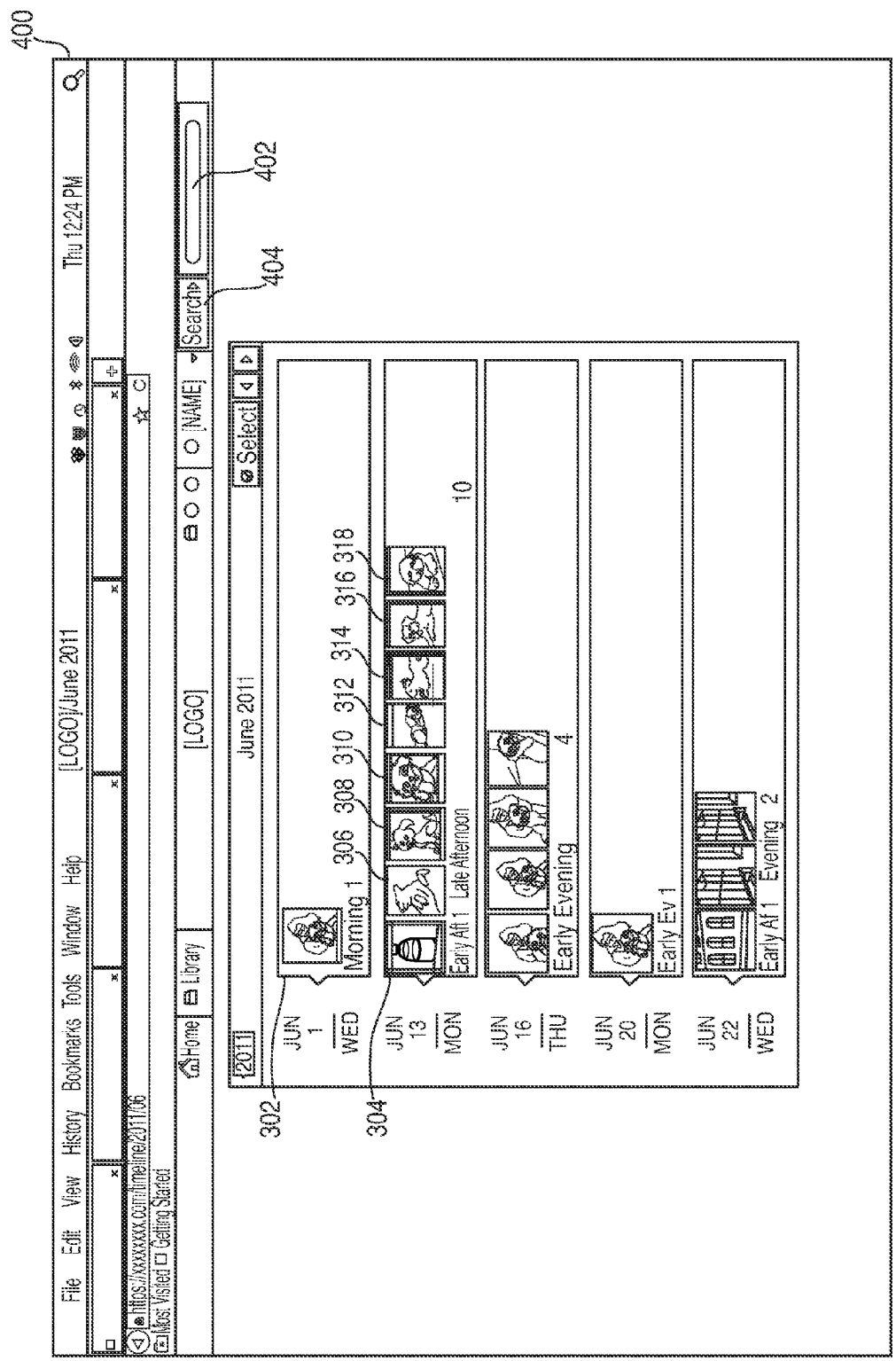
FIG. 4 is an exemplary user interface for presentation and organization of content in accordance with some embodiments of the invention.

FIG. 4 illustrates the clustering results in user interface 400 for Images A-I in FIG. 3A with the ROCK algorithm and numeric representations depicted in FIG. 3B for rule (1) of table 2.1 and FIG. 3C for rule (2) of table 2.1. As shown in FIG. 4, Image A 302 is in a cluster entitled "Morning" on Jun. 1, 2011, Image B 304 is in cluster entitled "Early Afternoon" on Jun. 13, 2011, and Images C 306 through Image I 318 are placed into cluster entitled "Late Afternoon" on Jun. 13, 2011.

In an embodiment where weights are employed, Image A 302 may be categorized with Images C 306 through Image I 318 with rule (2) as illustrated in column 317 of numeric representation 303 in FIG. 3C and the links 313 shown in FIG. 3A, but the "pull" for Image A 302 to be in the "Morning" cluster may outweigh the "pull" to be in a cluster on June 13. Continuing with the example, the weight applied for rule (1) based on time is "5" whereas the weight applied for rule (2) based on geolocation of images is "1," and as a result, time categorization of rule (1) factored more heavily in clustering of the images than space categorization of rule (2). The opposite may be true with image B 304 with a weighting of "5" on a time rule (1) because image B 304 may be clustered with images C-I even though the locations for image B 304 and Images C-I were greater than 1000 feet apart.

Continuing with reference to FIG. 2A, each image may be stored with a marker for a corresponding cluster (216). A marker may be any identifier that allows for identification of the cluster. In some embodiments, the clustering algorithm may define K centroids or geometric means, one for each cluster, which may be used for each marker. Any attribute of the images may be selected for computing the geometric mean of the cluster. For example, a date and time may be used for calculating the geometric mean of the cluster. In one embodiment, the marker (e.g., 2011061313) may be a string formed from concatenation of the date (e.g., 2011 (year), 06 (month), and 13 (day) for the cluster containing image B "Early Afternoon" on Jun. 13, 2011) and a geometric mean for the cluster (e.g., intra cluster time, hour 13). In this example, the geometric mean or average mean for the cluster is calculated by taking an average of creation time hour for the images within the cluster. As such, the geometric mean may be modified as more images are brought in to the cluster or removed from the cluster. However, the cluster marker mean may indicate the hour for the bulk of the photos within the cluster.

In some embodiments, by incorporating the geometric mean for the cluster (e.g., denoting the date and time to the hour for the bulk of the images within the cluster), the number of modifications to the marker for most images may be reduced. By way of example, if the bulk of the images (e.g., 100 images with hour 13) within a cluster are at hour 13,then placement of a low number of images into the cluster with a different hour (e.g., 5 images with hour 12) will not alter the mean, and as a result, not alter the marker for the majority of the images (e.g., 100 images with hour 13), assuming that the placement of the images with the different hour were reclustered and provided with a new marker. The reduction in the number of marker/identifier modifications may be preferable for other services provided by the content management system 100.

By way of example, if the marker is relied on for caching, then less modifications to markers for the bulk of the images may be preferable for caching techniques. Continuing with the example, if 100 images for a cluster were pre-loaded to a cache on a client device for a particular marker and 5 images were added to the cluster for the particular marker, then the 5 images may not alter the mean and the marker. As such, the 100 images may remain with the same marker name within the cache and not renamed with the introduction of the new 5 images.

In some embodiments, the marker may be used to search for images within a particular cluster by querying the database. For example, a search request may be received through a user interface to retrieve images in "early afternoon" on June 13$^{th}$, and a query may be executed against the database to retrieve images stored with a marker "20130613" concatenated with 11, 12,or 13,respectively to find images captured in early afternoon (e.g., handling hours 11:00 am, noon, and 1:00 pm) . The query may return results for execution against the database and return any images within clusters having markers 2012061311, 2012061312, 2012061313.

FIG. 2B is an exemplary flowchart for presentation and organization of content in accordance with some embodiments of the invention. FIG. 2B is an exemplary flowchart for pre-processing a plurality of images into a set of clusters for a clustering algorithm. A plurality of images is received and a new cluster is created with a chosen image from the plurality (201). The chosen image may be a first image from a plurality of images or any other selected image from the plurality. For each of the remaining images (203), comparisons are performed to cluster similar images.

To perform comparisons, in some embodiments, a timestamp for the image in the cluster may be compared to a timestamp of a next remaining image to determine whether the times are within a time threshold (205). The time threshold may be a period of time between the two times according to the timestamps. For example, if the times for the images are within eight hours of each other, then the images are within the time threshold. If the times are not within the time threshold (205), then a new cluster is created with the remaining image from the plurality (209). The process continues if there is a next remaining image (213).

Alternatively, if the timestamps are within a time threshold (205), then a determination is made as to whether the location for the image in the cluster and the next remaining image are within a location threshold (207). The location threshold may be a distance between the locations. For example, if the locations are within 125 meters of each other, then the images are within the location threshold. If the times are not within the location threshold (205), then a new cluster is created with the remaining image from the plurality (209). If there is a next remaining image (213), then the comparisons continue (205).

If the locations are within the location threshold (207), then the remaining image is added to a current cluster (211). If there is a next remaining image (213), then the comparisons continue (205). Alternatively, if there are no more remaining images for comparisons (213), then the process ends. The pre-processing may produce a set of clusters with similar images to shorten the processing time of the clustering algorithm.

In some embodiments, pre-processing may be performed to recluster a subset of clusters. For example, if a new set of images are received to be organized within clusters, images from the current set of clusters for the account that may be affected (e.g. a subset of clusters with markers denoting an average hour for the cluster within a certain period of time from creation time of the one or more new images) and the new images may be pre-processed to create a set of clusters for the cluster algorithm. The unaffected current set of clusters and the new clusters formed from the reclustering may be provided as input to the clustering algorithm.

FIG. 4 is an exemplary user interface for presentation and organization of content in accordance with some embodiments of the invention. In user interface 400, clusters are shown with images (e.g. Image A 302) from the cluster (e.g., "Morning" with one image Image A 302) for each of the days displayed in rows on the display. A search text box 402 is provided to enter a search query and user interface control 404 provides for submitting the request. Any type of search may be supported, such as natural language search and/or semantic search. As shown in FIG. 4, a temporal sequence of images that display a sample from each of the clusters may be displayed. For example, on Jun. 13, 2011,a sample of seven images from cluster entitled "Late Afternoon" may be selected from the 10 available images in the cluster. Sampling is described in more detail below with FIG. 5.

Figure 5:
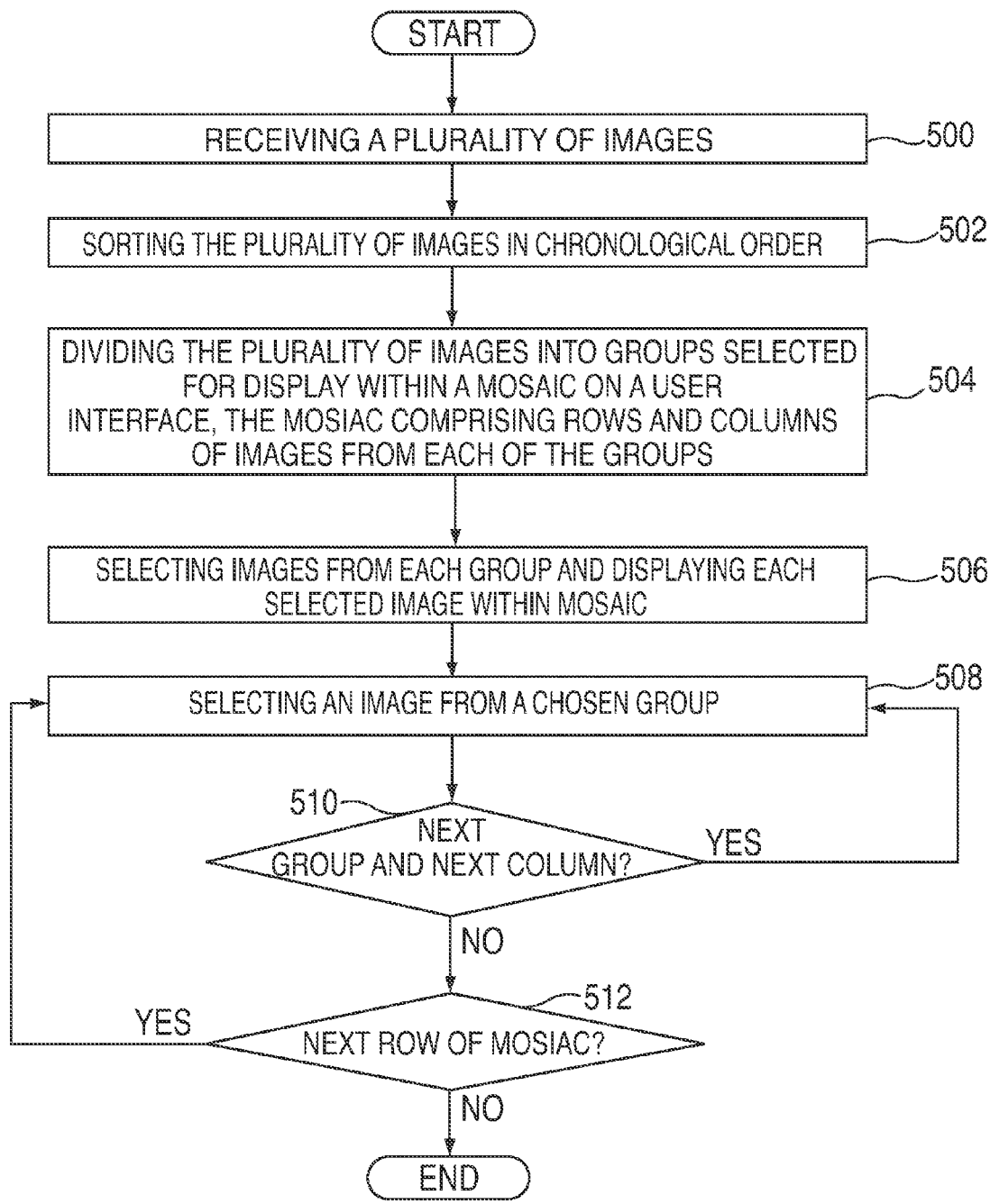
FIG. 5 is an exemplary flowchart for presentation and organization of content in accordance with some embodiments of the invention.

FIG. 5 is an exemplary flowchart for presentation and organization of content in accordance with some embodiments of the invention. FIG. 5 depicts a flowchart for presenting a sample of images for display. The sample may be a random or pseudo-random selection of images for presentation to the user. In some embodiments, the images may be selected as "cover" photos for further navigation to a cluster containing the "cover" photo, and the images may be selected to attract or encourage the user to navigate to clusters to explore their stored content. Processing to cluster images may be performed on the client device 102, the content management system 100, and/or any combination thereof, including distributing tasks across both. A plurality of images may be received (500). The plurality of images may be designated for management by the content management system 100 and stored within the content management system 100, client device 102 and/or any combination thereof. The plurality of images (502) may be sorted in chronological order (502). By sorting the images in chronological order based on creation time, a temporal sequence of images for a sample may be selected. In some embodiments, fuzzy date handling may be supported. For example, an image that does not have a creation time, or one that is assigned a partial date, may be corrected by the user by allowing the user to specify a date. Although sampling is described as using sorting in chronological order, those with skill in the art will recognize that sorting may be performed using various algorithms. For example, the images may be sorted alphabetically based on the titles of the images stored in the metadata.

Figure 6A:
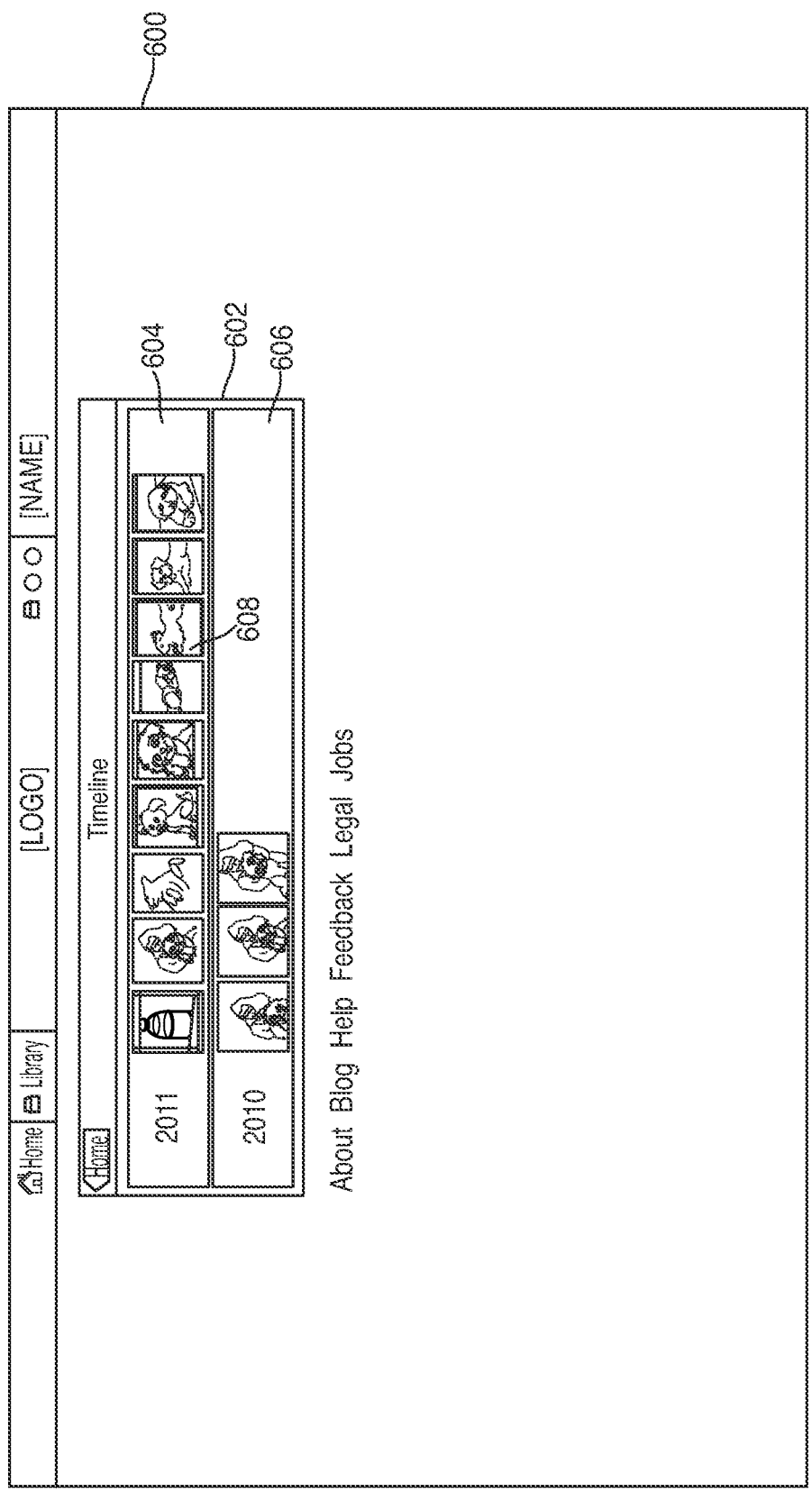
FIG. 6A illustrates an exemplary user interface for presentation and organization of content in accordance with some embodiments of the invention.

The plurality of images may be divided into groups selected for display within a mosaic on a user interface (504). The mosaic may be a grid with rows and columns of images selected from each of the groups. The number of groups may be determined based upon the amount of space available within a mosaic and/or the number of groups may be determined based upon a unit of time displayed within a row or a column of the mosaic. For example, the mosaic may have twelve rows (one for each month of a year) and the plurality may be divided into twelve groups for each year. Continuing with the example, the columns for each row of the mosaic may be determined based upon the amount of room on the display (e.g., one column on a mobile device and ten columns on a laptop display). FIG. 6A illustrates a user interface 600 with a mosaic 602 having two rows 604 and 606. Each row will be described in more detail below. In another example, if the user interface is being displayed on a mobile device, than the mosaic may only have four rows of three columns with a sample of photos from each month.

Images may be selected from each group and each selected image may be displayed within the mosaic (506). To populate the mosaic, images may be selected from a chosen group (508). Images may be chosen based upon any metadata or criteria associated with the image. The criteria for selecting an image from a group may include, but is not limited to, the attractiveness of the image, an indication that the image contains a person, an animal, or a particular gender of a person, a timestamp for last access of the image, and/or a score of popularity of the image. Each image selected may be displayed on a chosen row of the mosaic.

A determination is made as to whether there is a next group and/or next column within the chosen row for display of images (510). If there are more columns and groups, then an image is selected from the next chosen group (508) and the process continues.

Alternatively, if there are no more columns and groups (508), then a determination is made as to whether there is a next row of the mosaic (512). If there are more rows of the mosaic to populate (512), then an image is selected from a chosen group (508) and the process continues. Alternatively, if there are no more rows of the mosaic to populate (512), then the process ends.

FIG. 6A illustrates an exemplary user interface 600 for presentation and organization of content in accordance with some embodiments of the invention. A mosaic 602 is displayed within the user interface with samplings by year (e.g., from year 2011 in row 604 and year 2010 in row 606).

Figure 6B:
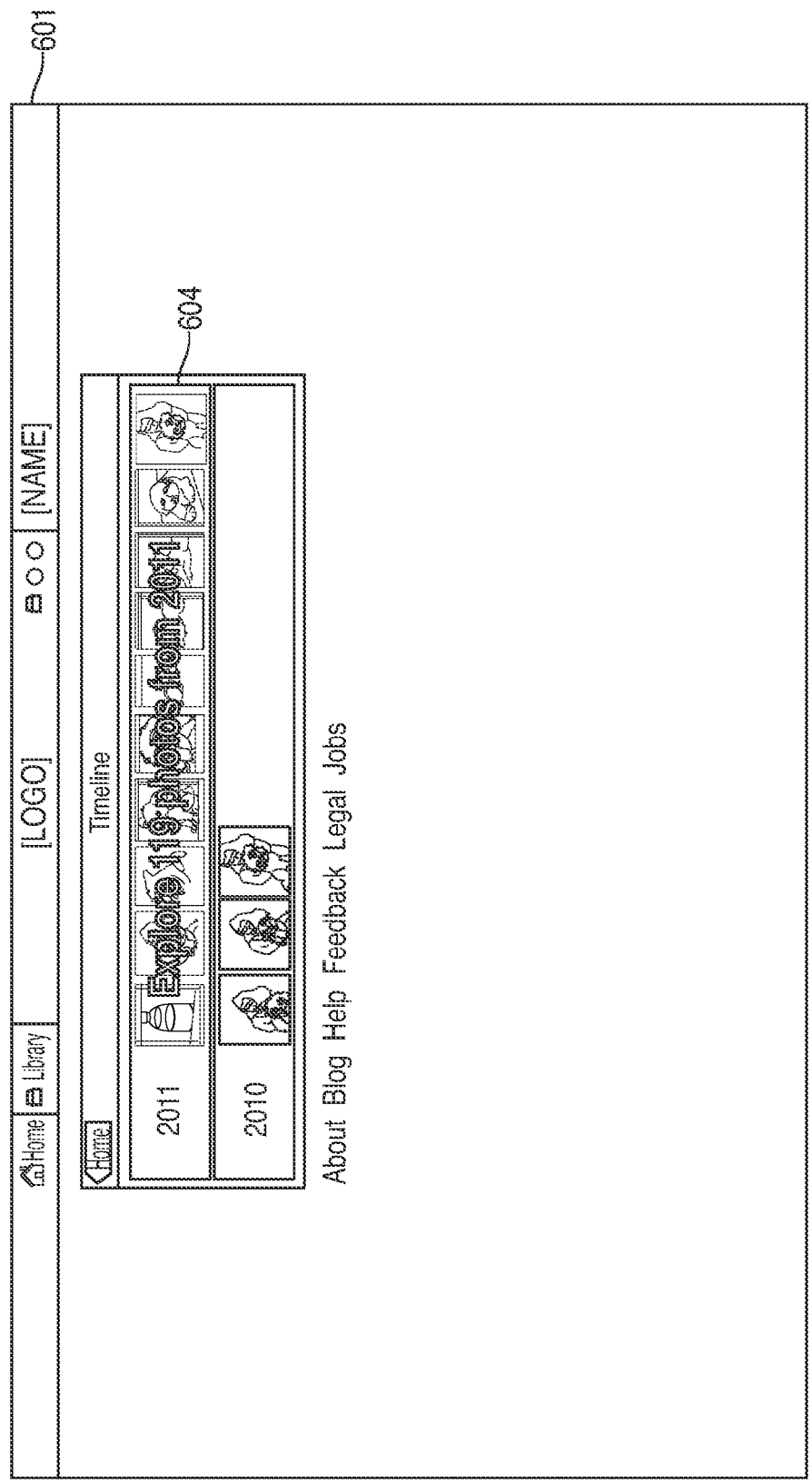
FIG. 6B illustrates an exemplary user interface for presentation and organization of content in accordance with some embodiments of the invention.

FIG. 6B illustrates an exemplary user interface 601 for presentation and organization of content in accordance with some embodiments of the invention. As shown in FIG. 6B, the sample in row 604 is selected from a plurality of images (e.g., "119 photos from 2011") as indicated when a user hovers over the mosaic row 604 with a cursor on the display.

Figure 7:
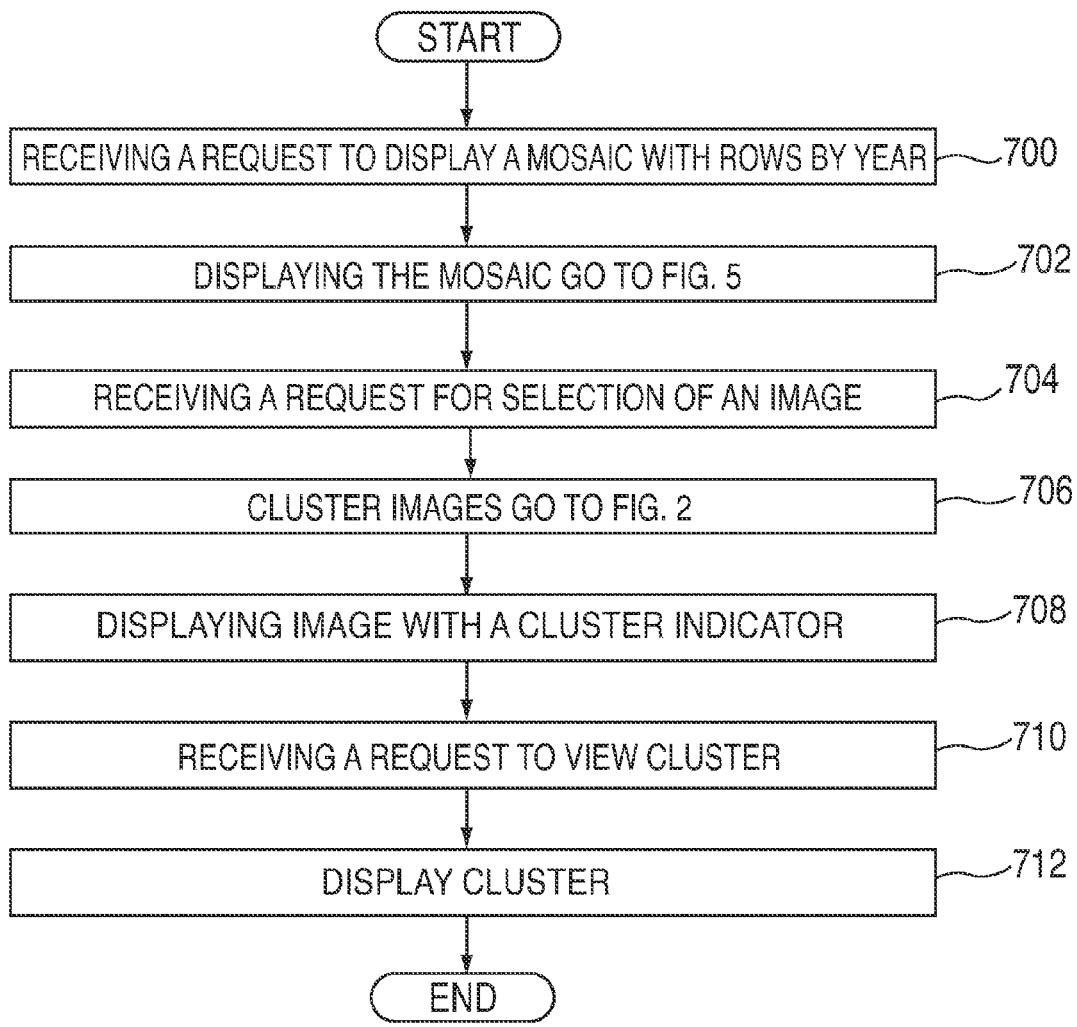
FIG. 7 is an exemplary flowchart for presentation and organization of content in accordance with some embodiments of the invention.

FIG. 7 is an exemplary flowchart for presentation and organization of content in accordance with some embodiments of the invention. FIG. 7 is a flowchart with an example of navigation through the user interfaces with content items organized for presentation with content management system 100. A request may be received to display a mosaic with rows by year (700). FIG. 6A illustrates a user interface 600 with a mosaic displaying images with rows by year. The mosaic is displayed using the methods described in FIG. 5 (702). A request is received for selection of an image (704). For example, a user may select image 608 by hovering the cursor over the image and selecting the image. Images may be clustered in accordance with the methods described in FIG. 2A (706). The image 608 may be displayed as shown in user interface 800 of FIG. 8 (708).

Figure 8:
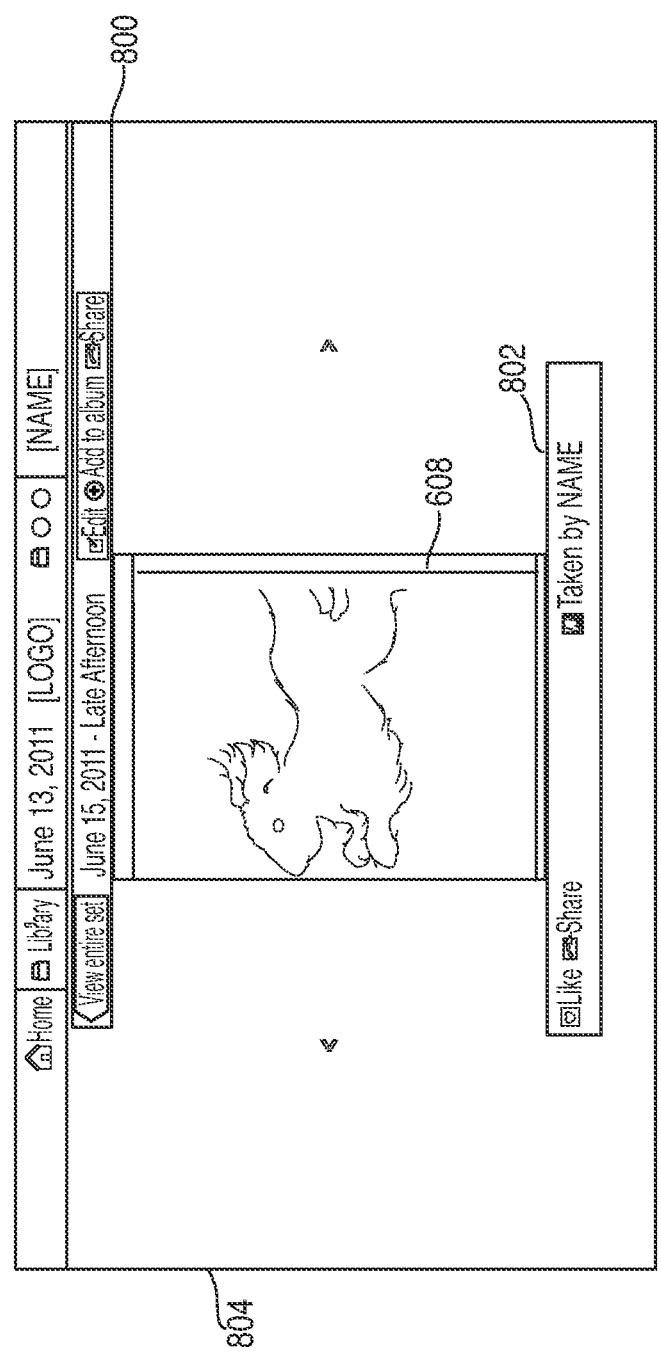
FIG. 8 illustrates an exemplary user interface for presentation and organization of content in accordance with some embodiments of the invention.

FIG. 8 illustrates an exemplary user interface for presentation and organization of content in accordance with some embodiments of the invention. Image 608 may be displayed with an indicator 802 for the cluster with the title "Late Afternoon." The user interface 800 may have a user interface control 804 to allow the user to navigate to view the other images within the cluster.

Continuing with FIG. 7, a request may be received to view the cluster (710) and the user may navigate to a user interface that displays the contents of the cluster.

Figure 9:
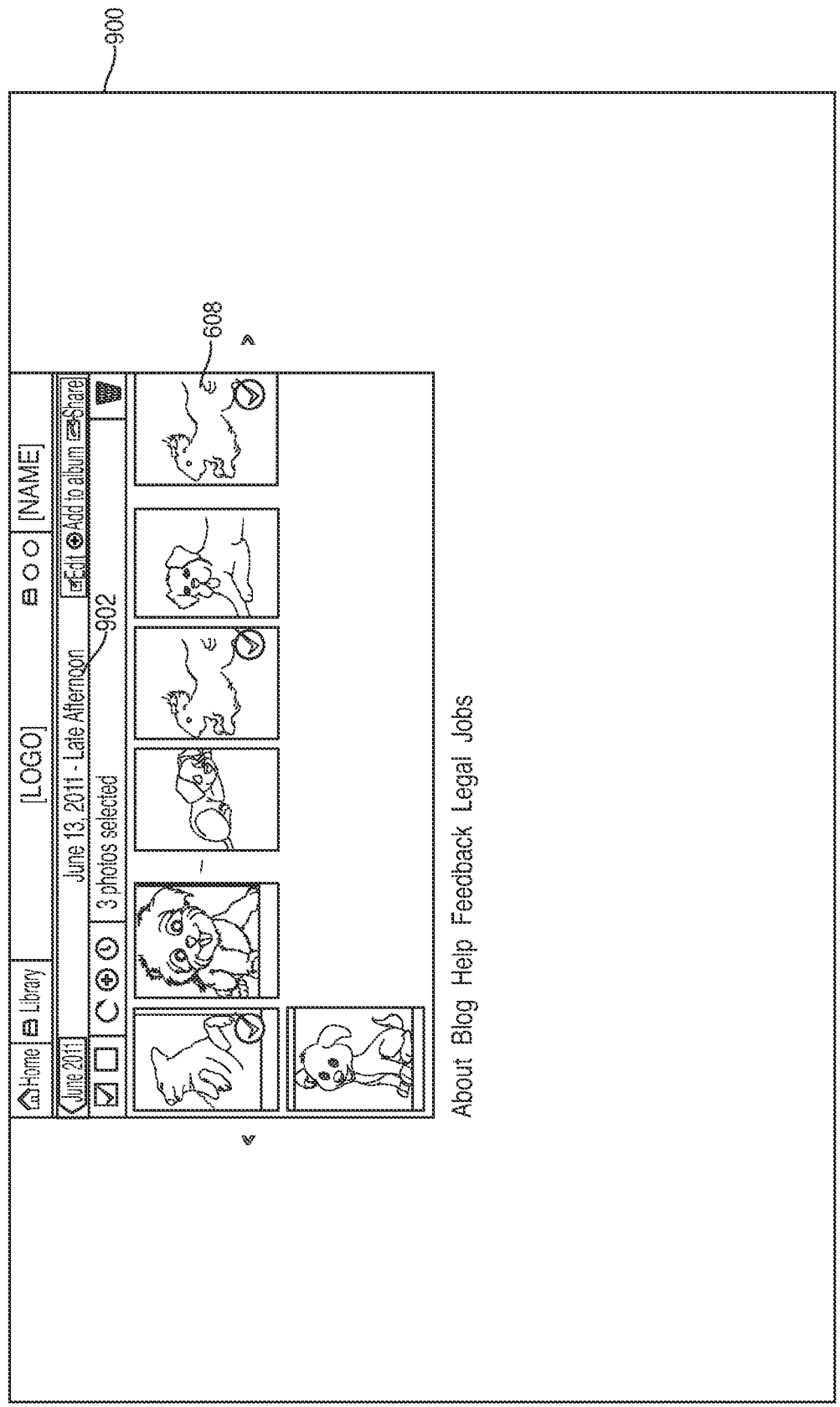
FIG. 9 illustrates an exemplary user interface for presentation and organization of content in accordance with some embodiments of the invention.

FIG. 9 illustrates an exemplary user interface 900 for presentation and organization of content in accordance with some embodiments of the invention. A cluster indicator 902 entitled "Late Afternoon" is displayed on user interface 900. Image 608 is displayed with the other images from a cluster containing image 608.

Figure 10:
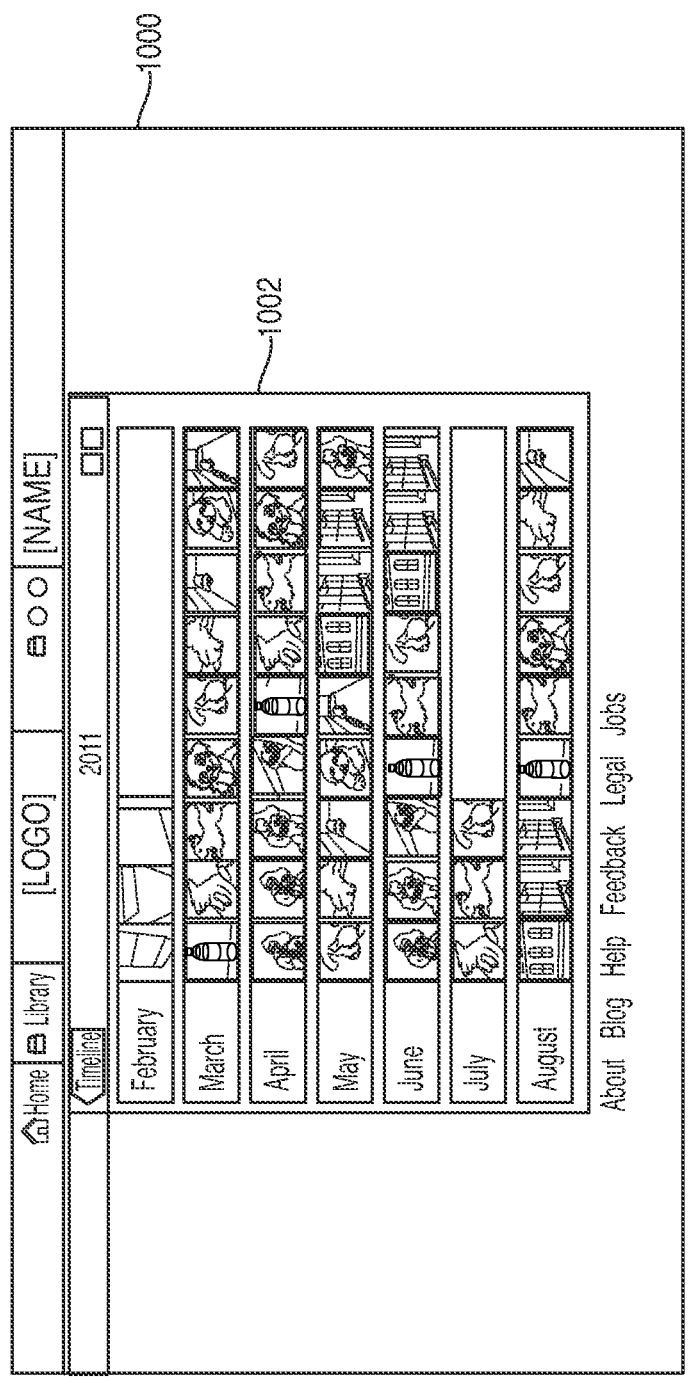
FIG. 10 illustrates an exemplary user interface for presentation and organization of content in accordance with some embodiments of the invention.

FIG. 10 illustrates an exemplary user interface 1000 for presentation and organization of content in accordance with some embodiments of the invention. User interface 1000 has illustrates a mosaic 1002 with rows by month.

Figure 11:
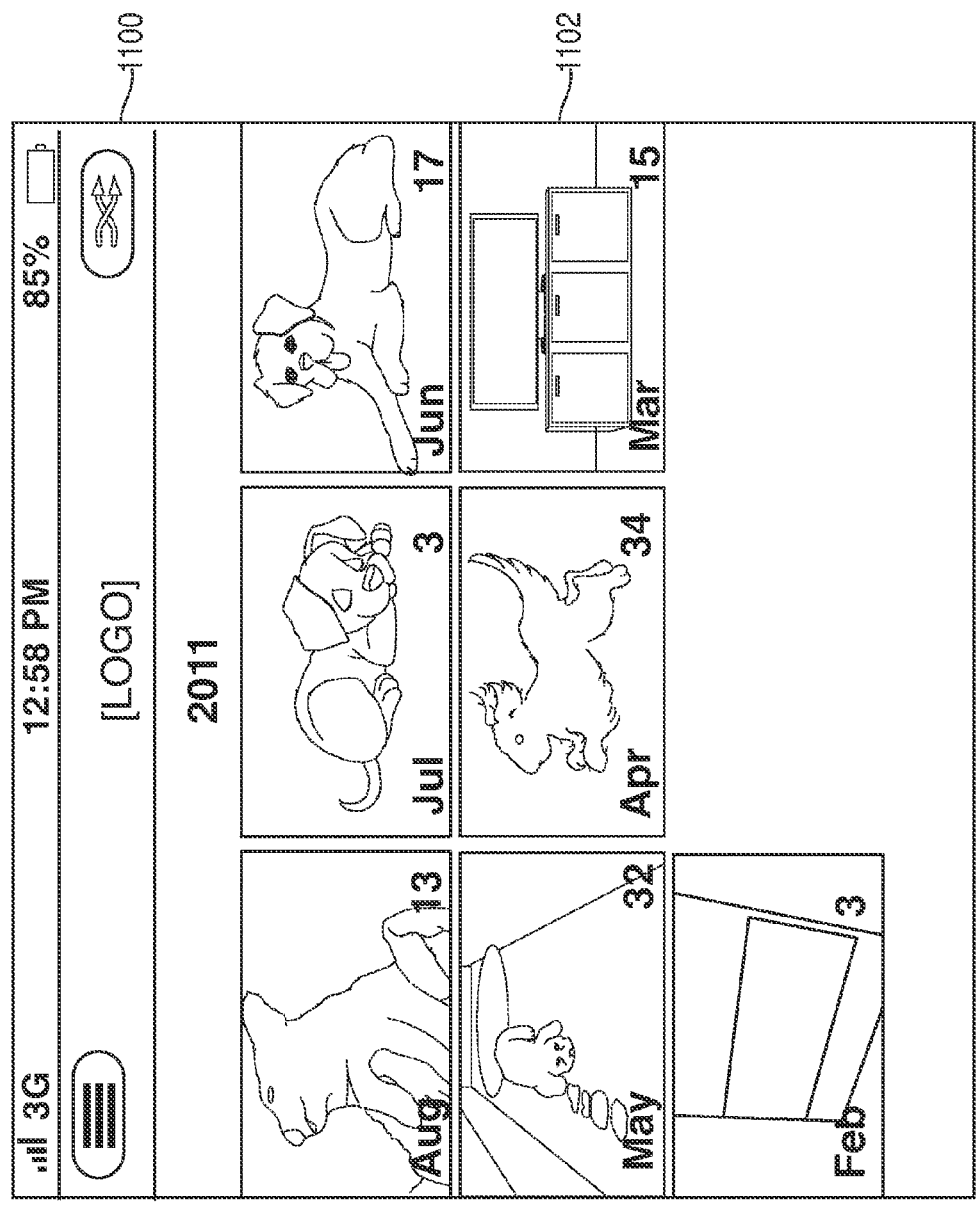
FIG. 11 illustrates an exemplary user interface for presentation and organization of content in accordance with some embodiments of the invention.

FIG. 11 illustrates an exemplary user interface 1100 for presentation and organization of content in accordance with some embodiments of the invention. User interface 1100 depicts a user interface for a mobile device with a mosaic 1102 having a sample of images for each month of the year.

Any suitable programming language can be used to implement the routines of particular embodiments including C, C++, Java, JavaScript, Python, Ruby, CoffeeScript, assembly language, etc. Different programming techniques can be employed such as procedural or object oriented. The routines can execute on a single processing device or multiple processors. Although the steps, operations, or computations may be presented in a specific order, this order may be changed in different particular embodiments. In some particular embodiments, multiple steps shown as sequential in this specification can be performed at the same time Particular embodiments may be implemented in a computer-readable storage device or non-transitory computer readable medium for use by or in connection with the instruction execution system, apparatus, system, or device. Particular embodiments can be implemented in the form of control logic in software or hardware or a combination of both. The control logic, when executed by one or more processors, may be operable to perform that which is described in particular embodiments.

Particular embodiments may be implemented by using a programmed general purpose digital computer, by using application specific integrated circuits, programmable logic devices, field programmable gate arrays, optical, chemical, biological, quantum or nanoengineered systems, components and mechanisms may be used. In general, the functions of particular embodiments can be achieved by any means as is known in the art. Distributed, networked systems, components, and/or circuits can be used. Communication, or transfer, of data may be wired, wireless, or by any other means.

It will also be appreciated that one or more of the elements depicted in the drawings/figures can also be implemented in a more separated or integrated manner, or even removed or rendered as inoperable in certain cases, as is useful in accordance with a particular application. It is also within the spirit and scope to implement a program or code that can be stored in a machine-readable medium, such as a storage device, to permit a computer to perform any of the methods described above.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

While there have been described methods for organization and presentation of photos thereof, it is to be understood that many changes may be made therein without departing from the spirit and scope of the invention. Insubstantial changes from the claimed subject matter as viewed by a person with ordinary skill in the art, no known or later devised, are expressly contemplated as being equivalently within the scope of the claims. Therefore, obvious substitutions now or later known to one with ordinary skill in the art are defined to be within the scope of the defined elements. The described embodiments of the invention are presented for the purpose of illustration and not of limitation.

The invention claimed is:

1. A method comprising:
at one or more computing devices comprising one or more processors and memory storing one or more computer programs executed to perform the method, performing operations comprising:
   determining a plurality of numeric representations for each pair of digital images, of a plurality of pairs of digital images, according to a plurality of similarity rules applied to the each pair of digital images;
   for the each pair of digital images, of the plurality of pairs of digital images, determining a link density based at least upon the plurality of numeric representations determined for the each pair of digital images;
   forming a cluster comprising one or more pairs of digital images of the plurality of pairs of digital images, based at least upon the link densities determined for the plurality of pairs of digital images; and
   storing, in the memory, data identifying the one or more pairs of digital images in the cluster.

2. The method of claim 1, wherein determining the link density further comprises:
   determining a set of links for the each pair of digital images; and
   wherein a link in the set of links exists when a corresponding numeric representation, of the plurality of numeric representations, for the each pair of digital images, of the plurality of pairs of digital images, is above a threshold defined for a similarity rule for which the corresponding numeric representation has been determined.

3. The method of claim 1, wherein the plurality of similarity rules comprises at least one of (i) a rule defining a maximum difference between creation times of digital images, (ii) a rule defining a maximum distance between geolocations associated with digital images, (iii) a rule for digital images having one at least one of: similar colors or similar tone, (iv) a rule for similarity of objects depicted in digital images, (v) a rule for a same device serial number for a device that created digital images, (vi) a rule for similar titles of digital images, (vii) a rule for a same user associated with digital images, (viii) a rule defining a maximum difference between update times of digital images, ix) a rule for similar version numbers of digital images, ix) a rule defining a maximum difference between timestamps of synchronization of digital images between a content management system and a client electronic device.

4. The method of claim 1, wherein the plurality of numeric representations is obtained by applying each of the plurality of similarity rules, weighted with a respective weight, to the each pair of digital images.

5. The method of claim 1, further comprising:
receiving a request to generate a user defined similarity rule along with a user specified weight to assign to the user defined similarity rule;
wherein the plurality of similarity rules includes the user defined similarity rule;
and wherein the plurality of numeric representations is obtained by:
   applying the user defined similarity rule weighted with the user specified weight to the each pair of digital images, of the plurality of pairs of digital images; and
   applying a similarity rule, from the plurality of similarity rules other than the user defined similarity rule, weighted with a pre-defined weight to the each pair of digital images, of the plurality of pairs of digital images.

6. The method of claim 1, the method further comprising:
displaying, within a user interface, a mosaic comprising a number of groups of digital images, each group corresponding to each cluster in a plurality of clusters that includes the cluster, the mosaic comprising rows and columns of digital images;
selecting a digital image from the each group based on at least one of: a score for attractiveness for the selected digital image, an indication that the selected digital image comprises a person, a timestamp for last access to the selected digital image, or a score for popularity of the selected digital image; and
displaying the selected digital image within the mosaic.

7. The method of claim 1, further comprising:
obtaining a marker using attributes of at least two digital images in the cluster;
wherein the marker of the cluster represents one or more similarities identified among the at least two digital images;
storing the marker in association with each digital image in the cluster;
receiving a search query for identifying one or more digital images;
determining, based on the search query, that the marker matches the search query;
based on the marker, modifying the search query into a modified search query; and
identifying the one or more digital images that match the modified search query.

8. The method of claim 1, further comprising:
receiving a new digital image at a content management system;
extracting from the new digital image a plurality of attributes corresponding to the plurality of similarity rules;
based on the plurality of attributes, determining a new plurality of numeric representations according to the plurality of similarity rules applied to each pair of: the new digital image and each digital image in the cluster; and based on the new plurality of numeric representations, determining whether to add the new digital image to the cluster.

9. The method of claim 1, wherein the one or more pairs of digital images in the cluster are associated with a user, and the method further comprising:

storing, on a client electronic device of the user, copies of the one or more pairs of digital images in the cluster stored on a content management system.

10. The method of claim 1, wherein the one or more pairs of digital images in the cluster are associated with a user, and the method further comprising:

storing, on a client electronic device of the user, copies of the one or more pairs of digital images in the cluster stored on a content management system and a copy of a marker corresponding to the cluster and associated with each digital image in the cluster;

receiving a new digital image at the content management system;

extracting, from the new content item digital image, one or more attributes corresponding to the marker of the cluster;

based on the one or more attributes, determining a new plurality of numeric representations according to the plurality of similarity rules applied to each pair of: the new digital image and each digital image in the cluster;

based on the new plurality of numeric representations, determining whether to leave the marker unchanged after adding the new digital image to the cluster; and adding the new digital image to the cluster without modifying the copy of the marker stored on the client electronic device.

11. The method of claim 1, further comprising:

obtaining a plurality of digital images clustered into a second cluster;

determining a particular plurality of numeric representations according the plurality of similarity rules applied to each particular pair of: each digital image digital images in the second cluster and each digital image in the cluster;

determining a cluster link density based at least upon the particular plurality of numeric representations; and based on the cluster link density, forming a merged cluster by merging the cluster and the second cluster.

12. A content management system for organizing and presenting digital images hosted on the content management system, the system comprising memory and one or more hardware processors configured to perform operations comprising:

determining a plurality of numeric representations for each pair of digital images, of a plurality of pairs of digital images, according to a plurality of similarity rules applied to the each pair of digital images;

for the each pair of digital images, of the plurality of pairs of digital images, determining a link density based at least upon the plurality of numeric representations determined for the each pair of digital images;

forming a cluster comprising one or more pairs of digital images of the plurality of pairs of digital images, based at least upon the link densities determined for the plurality of pairs of digital images; and storing, in the memory, data identifying the one or more pairs of digital images in the cluster.

13. The system of claim 12, wherein the operations further comprise:

determining a set of links for the each pair of digital images; and wherein a link in the set of links exists when a corresponding numeric representation, of the plurality of numeric representations, for the each pair of digital images, of the plurality of pairs of digital images, is above a threshold defined for a similarity rule for which the corresponding numeric representation has been determined.

14. The system of claim 12, wherein the operations further comprise:

receiving a request to generate a user defined similarity rule along with a user specified weight to assign to the user defined similarity rule;

wherein the plurality of similarity rules includes the user defined similarity rule;

and wherein the plurality of numeric representations is obtained by:

applying the user defined similarity rule weighted with the user specified weight to the each pair of digital images, of the plurality of pairs of digital images; and applying a similarity rule, from the plurality of similarity rules other than the user defined similarity rule, weighted with a pre-defined weight to the each pair of digital images, of the plurality of pairs of digital images.

15. The system of claim 12, wherein the operations further comprise:

displaying, within a user interface, a mosaic comprising a number of groups of digital images, each group corresponding to each cluster in a plurality of clusters that includes the cluster, the mosaic comprising rows and columns of digital images;

selecting a digital image from the each group based on at least one of: a score for attractiveness for the selected digital image, an indication that the selected digital image comprises a person, a timestamp for last access to the selected digital image, or a score for popularity of the selected digital image; and displaying the selected digital image within the mosaic.

16. The system of claim 12, wherein the operations further comprise:

receiving a new digital image at the content management system;

extracting from the new digital image a plurality of attributes corresponding to the plurality of similarity rules;

based on the plurality of attributes, determining a new plurality of numeric representations according to the plurality of similarity rules applied to each pair of: the new digital image and each digital image in the cluster; and based on the new plurality of numeric representations, determining whether to add the new digital image to the cluster.

17. The system of claim 12, wherein the one or more pairs of digital images in the cluster are associated with a user, and wherein the operations further comprise:

storing, on a client electronic device of the user, copies of the one or more pairs of digital images in the cluster stored on the content management system.

18. The system of claim 12, wherein the one or more pairs of digital images in the cluster are associated with a user, and wherein the operations further comprise:

storing, on a client electronic device of the user, copies of the one or more pairs of digital images in the cluster stored on the content management system and a copy of a marker corresponding to the cluster and associated with each digital image in the cluster;

receiving a new digital image at the content management system;

extracting, from the new digital image, one or more attributes corresponding to the marker of the cluster;

based on the one or more attributes, determining a new plurality of numeric representations according to the plurality of similarity rules applied to each pair of: the new digital image and each digital image in the cluster;

based on the new plurality of numeric representations, determining to leave the marker unchanged after adding the new digital image to the cluster; and adding the new digital image to the cluster without modifying the copy of the marker stored on the client electronic device.

19. The system of claim 12, wherein the plurality of similarity rules comprises at least one of (i) a rule defining a maximum difference between creation times of digital images, (ii) a rule defining a maximum distance between geolocations associated with digital images, (iii) a rule for digital images having one at least one of: similar colors or similar tone, (iv) a rule for similarity of objects depicted in digital images, (v) a rule for a same device serial number for a device that created digital images, (vi) a rule for similar titles of digital images, (vii) a rule for a same user associated with digital images, (viii) a rule defining a maximum difference between update times of digital images, ix) a rule for similar version numbers of digital images, ix) a rule defining a maximum difference between timestamps of synchronization of digital images between the content management system and a client electronic device.

20. The system of claim 12, wherein the plurality of numeric representations is obtained by applying each of the plurality of similarity rules, weighted with a respective weight, to the each pair of digital images.

* * * * *